United States Patent
Hesse et al.

(10) Patent No.: US 9,802,864 B2
(45) Date of Patent: Oct. 31, 2017

(54) ADDITIVE FOR MASSES THAT SET HYDRAULICALLY

(71) Applicant: BASF SE, Ludwigshafen (DE)

(72) Inventors: Christoph Hesse, Ebersberg (DE); Manfred Bichler, Engelsberg (DE); Alexander Kraus, Pittenhart (DE); Luc Nicoleau, Ludwigshafen am Rhein (DE); Torben Gädt, Traunstein (DE); Martin Winklbauer, Halsbach (DE)

(73) Assignee: BASF SE, Ludwigshafen (DE)

( * ) Notice: Subject to any disclaimer, the term of this patent is extended or adjusted under 35 U.S.C. 154(b) by 273 days.

(21) Appl. No.: 14/758,980

(22) PCT Filed: Jan. 27, 2014

(86) PCT No.: PCT/EP2014/051494
§ 371 (c)(1),
(2) Date: Jul. 2, 2015

(87) PCT Pub. No.: WO2014/114784
PCT Pub. Date: Jul. 31, 2014

(65) Prior Publication Data
US 2015/0344368 A1 Dec. 3, 2015

Related U.S. Application Data

(60) Provisional application No. 61/756,488, filed on Jan. 25, 2013.

(30) Foreign Application Priority Data

Jan. 25, 2013 (EP) ..................... 13152684

(51) Int. Cl.
C04B 22/14 (2006.01)
C04B 24/16 (2006.01)
C04B 40/00 (2006.01)
C04B 103/14 (2006.01)
C04B 103/52 (2006.01)

(52) U.S. Cl.
CPC .......... *C04B 22/143* (2013.01); *C04B 22/147* (2013.01); *C04B 24/16* (2013.01); *C04B 40/0042* (2013.01); *C04B 2103/14* (2013.01); *C04B 2103/52* (2013.01)

(58) Field of Classification Search
CPC .................................................. C04B 22/143
USPC ....................................................... 524/157
See application file for complete search history.

(56) References Cited

U.S. PATENT DOCUMENTS

| 6,187,841 | B1 | 2/2001 | Tanaka et al. |
| 6,211,317 | B1 | 4/2001 | Albrecht et al. |
| 6,376,581 | B1 | 4/2002 | Tanaka et al. |
| 6,855,752 | B2 | 2/2005 | Velten et al. |
| 7,041,167 | B2 | 5/2006 | Jiang |
| 7,842,766 | B2 | 11/2010 | Kraus et al. |
| 7,910,640 | B2 | 3/2011 | Wieland et al. |
| 8,608,847 | B2 * | 12/2013 | Buerge .................. C04B 24/243 106/630 |
| 8,653,186 | B2 | 2/2014 | Nicoleau et al. |
| 2006/0172916 | A1 * | 8/2006 | Hidalgo .............. B01F 17/0028 510/475 |
| 2008/0108732 | A1 | 5/2008 | Wieland et al. |
| 2011/0263749 | A1 * | 10/2011 | Reichenbach-Klinke C04B 24/2647 523/130 |
| 2012/0216724 | A1 * | 8/2012 | Nicoleau ................. C04B 28/02 106/808 |
| 2012/0270969 | A1 * | 10/2012 | Bichler ................... C04B 28/04 524/5 |
| 2013/0035423 | A1 | 2/2013 | Sabio et al. |
| 2013/0217808 | A1 | 8/2013 | Sulser et al. |
| 2014/0305345 | A1 | 10/2014 | Wombacher et al. |

FOREIGN PATENT DOCUMENTS

| CA | 2 788 620 A1 | 10/2011 |
| DE | 10 2004 050 395 A1 | 4/2006 |
| EP | 0 753 488 A2 | 1/1997 |
| EP | 0 894 811 A1 | 2/1999 |
| EP | 1 138 697 B1 | 11/2003 |
| EP | 1 851 256 B1 | 8/2010 |
| EP | 2 463 314 A1 | 6/2012 |
| WO | 02/070425 A1 | 9/2002 |
| WO | 2006/042709 A1 | 4/2006 |
| WO | 2010/026155 A1 | 3/2010 |
| WO | 2011/131378 A1 | 10/2011 |
| WO | 2011/131904 A1 | 10/2011 |
| WO | 2012/025567 A1 | 3/2012 |
| WO | 2013/083627 A1 | 6/2013 |

* cited by examiner

*Primary Examiner* — Doris Lee
(74) *Attorney, Agent, or Firm* — Oblon, McClelland, Maier & Neustadt, L.L.P.

(57) ABSTRACT

The invention relates to an additive which can be used as a hardening accelerator for hydraulically setting compositions, comprising a) at least one polymeric dispersant comprising structural units having anionic or anionogenic groups and structural units having polyether side chains, b) at least one sulfonic acid compound of the formula (I)

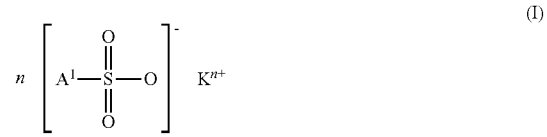

in which $A^1$ is $NH_2$, $NHMe$, $NMe_2$, $N(CH_2-CH_2-OH)_2$, $CH_3$, $C_2H_5$, $CH_2-CH_2-OH$, phenyl, or p-$CH_3$-phenyl and $K^{n+}$ is an alkali metal cation, or one equivalent of a cation selected from $Ca^{2+}$, $Mg^{2+}$, $Sr^{2+}$, $Ba^{2+}$, $Zn^{2+}$, $Fe^{2+}$, $Fe^{3+}$, $Al^{3+}$, $Mn^{2+}$, or $Cu^{2+}$, and c) calcium silicate hydrate particles.

18 Claims, No Drawings

ADDITIVE FOR MASSES THAT SET HYDRAULICALLY

This application is a §371 of International Application No. PCT/EP2014/051494 filed Jan. 27, 2014, and claims priority from U.S. Provisional Patent Application No. 61/756,488 filed Jan. 25, 2013 and European Patent Application No. 13152684.0 filed Jan. 25, 2013, each of which is incorporated herein by reference in its entirety for all purposes.

The present invention relates to an additive for hydraulically setting compositions, to a process for preparing the additive, and to the use of the additive.

It is known that additives are often added to aqueous slurries of organic or inorganic substances in powder form, such as clays, finely ground silicate, chalk, carbon black, finely ground rocks, and hydraulic binders, for the purpose of improving their processing properties—i.e., kneadability, spreadability, sprayability, pumpability, or fluidity. Certain additives, comprising hardening accelerators, have a capacity to shorten the curing procedure. This property is also exploited deliberately in connection, in particular, with the production of building material mixtures which comprise hydraulic binders, such as cement, lime, gypsum, calcium sulfate hemihydrates (bassanite), or anhydrous calcium sulfate (anhydrite), or latent hydraulic binders such as flyash, blast furnace slag, or pozzolans.

In accordance with WO 02/070425, calcium silicate hydrate (C—S—H), more particularly in dispersed form (finely or very finely dispersed), can be used as a hardening accelerator. WO 2010/026155 discloses a composition comprising a water-soluble comb polymer, which is suitable as plasticizer for hydraulic binders, and also comprising calcium silicate hydrate particles having a particle diameter <500 nm. The sources of calcium used by the prior art for producing the C—S—H particles include calcium formate, calcium chloride, calcium nitrate, calcium acetate, and calcium sulfate.

WO 2012/025567 describes a method for producing a setting and hardening accelerator for hydraulic binders by reacting a calcium compound, which among others may be calcium sulfamate, with a silicon compound, accompanied by addition of a phosphonic acid derivative that comprises a polyalkylene oxide chain. The phosphonic acid derivative is prepared by esterifying or amidating a phosphonic acid compound with one or more polyalkylene oxide compounds. The derivative therefore has a terminal phosphonic acid group. Consequently it is not a polymeric dispersant composed of structural units having anionic or anionogenic groups and structural units having polyether side chains.

WO 2013/083627 describes a method for producing a setting and hardening accelerator for mineral binders, comprising the steps of reacting a calcium compound with a silicon compound and adding an acidic compound having a molecular weight of not more than 200 g/mol. It involves the addition of an excess of the acidic compound and the addition always of a further hardening accelerator, namely methydiethanolamine, to a solution of the calcium compound. The mixture is then mixed with a solution of the silicon compound, without use of a dispersant.

Primarily because of the anions which remain in the product, the known hardening accelerators possess a number of disadvantages. Calcium silicate hydrate-based hardening accelerators prepared using the stated calcium compounds as their source of calcium lose a considerable part of their activity by drying. This is especially the case when using calcium formate. The use of calcium chloride produces mixtures having a corrosive effect. The use of calcium nitrate with organic substances, such as other additives for hydraulically setting compositions, for example, is objectionable on the basis of the oxidizing nitrate ions. Products based on calcium acetate are hygroscopic. Calcium sulfate, in turn, may give rise to solubility problems. The effect of the hardening accelerator obtained by the method described in WO 2013/083627 is inadequate in the range of up to about six hours. In particular it will hardly be possible for concrete moldings to be deshuttered early and hence for the production cycles to be accelerated.

On account of the stated disadvantages, the various hardening accelerators can each be used only under defined conditions. Since water, even in small amounts, is deleterious to dry binders, especially cement, the calcium silicate hydrate-based hardening accelerators in suspension form cannot be used as additives for dry binders. Moreover, for many applications, chloride-containing concrete admixtures are prohibited.

It is therefore an object of the present invention to provide an additive for hydraulically setting compositions that acts as a hardening accelerator, more particularly for increasing the early strengths, with early strength referring preferentially to the compressive strength after 24 hours, especially preferably to the compressive strength after ten hours, and at most preferably to the compressive strength after six hours.

The present invention is further based on the object of providing an additive in the form of a dry product, more particularly a powder, for hydraulically setting compositions, that acts as a hardening accelerator and can be added to dry hydraulic binders. More particularly the present invention is based on the object of providing a universally useful additive for hydraulically setting compositions, in the form of a dry product, more particularly a powder, whose effect even in the dry state is substantially comparable with the effect of the suspension.

These objects are achieved by an additive for hydraulically setting compositions, comprising a dispersant, at least one nonpolymeric sulfonic acid compound, and calcium silicate hydrate particles.

The invention provides an additive for hydraulically setting compositions. Embodiments of the invention are as follows:

1. An additive for hydraulically setting compositions, comprising
   a) at least one polymeric dispersant comprising structural units having anionic or anionogenic groups and structural units having polyether side chains,
   b) at least one sulfonic acid compound of the formula (I)

in which
A$^1$ is NH$_2$, NHMe, NMe$_2$, N(CH$_2$—CH$_2$—OH)$_2$, CH$_3$, C$_2$H$_5$, CH$_2$—CH$_2$—OH, phenyl, or p-CH$_3$-phenyl, and $K^{n+}$ is an alkali metal cation, or a divalent or trivalent cation preferably selected from $Ca^{2+}$, $Mg^{2+}$, $Sr^{2+}$, $Ba^{2+}$, $Zn^{2+}$, $Fe^{2+}$, $Fe^{3+}$, $Al^{3+}$, $Mn^{2+}$, or $Cu^{2+}$, preferably an alkali metal cation or $Ca^{2+}$, and n is the value of the cation, and c) calcium silicate hydrate particles.

2. The additive according to embodiment 1, wherein $A^1$ is $NH_2$ or $CH_3$.
3. The additive according to embodiment 1 or 2, wherein $K^{n+}$ is $Na^+$, $K^+$, or $Ca^{2+}$.
4. The additive according to embodiment 3, wherein $K^{n+}$ is $Ca^{2+}$.
5. The additive according to any of the preceding embodiments, wherein the dispersant comprises at least one polymer obtained by polymerizing at least one monomer having at least one anionic or anionogenic group and at least one monomer comprising at least one polyether side chain.
6. The additive according to embodiment 5, wherein the polymer as anionic or anionogenic group has at least one structural unit of the general formulae (Ia), (Ib), (Ic) and/or (Id):

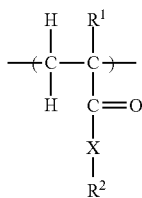
(Ia)

in which $R^1$ is H or an unbranched or branched $C_1$-$C_4$ alkyl group, $CH_2COOH$, or $CH_2CO$—X—$R^3$;

X is NH—$(C_nH_{2n})$ or O—$(C_nH_{2n})$ with n=1, 2, 3, or 4, or is a chemical bond, the nitrogen atom or oxygen atom, respectively, being bonded to the CO group;

$R^2$ is OM, $PO_3M_2$, or O—$PO_3M_2$; with the proviso that X is a chemical bond if $R^2$ is OM;

$R^3$ is $PO_3M_2$, or O—$PO_3M_2$;

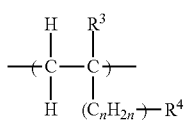
(Ib)

in which $R^3$ is H or an unbranched or branched $C_1$-$C_4$ alkyl group;

n is 0, 1, 2, 3, or 4;

$R^4$ is $PO_3M_2$, or O—$PO_3M_2$;

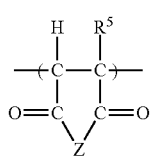
(Ic)

in which $R^5$ is H or an unbranched or branched $C_1$-$C_4$ alkyl group;

Z is O or $NR^7$; and $R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;

n is 1, 2, 3, or 4;

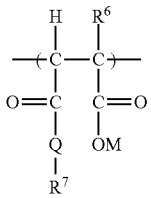
(Id)

in which $R^6$ is H or an unbranched or branched $C_1$-$C_4$ alkyl group;

Q is $NR^7$ or O;

$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;

n is 1, 2, 3, or 4; and each M independently of any other is H or one cation equivalent.

7. The additive according to embodiment 6, wherein the polymer as anionic or anionogenic group has at least one structural unit of the formula (Ia) in which $R^1$ is H or $CH^3$; and/or at least one structural unit of the formula (Ib) in which $R^3$ is H or $CH_3$; and/or at least one structural unit of the formula (Ic) in which $R^5$ is H or $CH_3$ and Z is O; and/or at least one structural unit of the formula (Id) in which $R^6$ is H and Q is O.
8. The additive according to embodiment 6 or 7, wherein the polymeric dispersant as anionic or anionogenic group has at least one structural unit of the formula (Ia) in which $R^1$ is H or $CH_3$ and $XR^2$ is OM or X is $O(C_nH_{2n})$ with n=1, 2, 3, or 4, more particularly 2, and $R^2$ is O—$PO_3M_2$.
9. The additive according to any of embodiments 5 to 8, wherein the polymer as polyether side chain has at least one structural unit of the general formulae (IIa), (IIb), (IIc) and/or (IId):

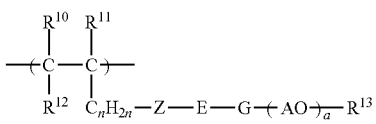
(IIa)

in which $R^{10}$, $R^{11}$, and $R^{12}$ independently of one another are H or an unbranched or branched $C_1$-$C_4$ alkyl group;

Z is O or S;

E is an unbranched or branched $C_1$-$C_6$ alkylene group, a cyclohexylene group, $CH_2$—$C_6H_{10}$, 1,2-phenylene, 1,3-phenylene, or 1,4-phenylene;

G is O, NH, or CO—NH; or

E and G together are a chemical bond;

A is $C_xH_{2x}$ with x=2, 3, 4, or 5, or $CH_2CH(C_6H_5)$;

n is 0, 1, 2, 3, 4, and/or 5;

a is an integer from 2 to 350;

$R^{13}$ is H, an unbranched or branched $C_1$-$C_4$ alkyl group, CO—$NH_2$ and/or $COCH_3$;

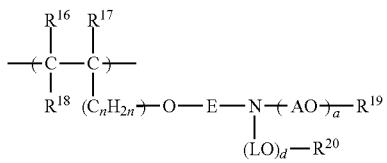

(IIb)

in which
R$^{16}$, R$^{17}$, and R$^{18}$ independently of one another are H or an unbranched or branched C$_1$-C$_4$ alkyl group;
E is an unbranched or branched C$_1$-C$_6$ alkylene group, a cyclohexylene group, CH$_2$—C$_6$H$_{10}$, 1,2-phenylene, 1,3-phenylene, or 1,4-phenylene, or a chemical bond;
A is C$_x$H$_{2x}$ with x=2, 3, 4, or 5, or CH$_2$CH(C$_6$H$_5$);
L is C$_x$H$_{2x}$ with x=2, 3, 4, or 5, or CH$_2$—CH(C$_6$H$_5$);
a is an integer from 2 to 350;
d is an integer from 1 to 350;
R$^{19}$ is H or an unbranched or branched C$_1$-C$_4$ alkyl group;
R$^{20}$ is H or an unbranched or branched C$_1$-C$_4$ alkyl group; and
n is 0, 1, 2, 3, 4, or 5;

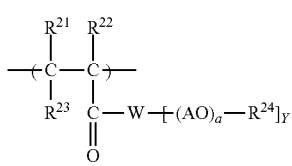

(IIc)

in which
R$^{21}$, R$^{22}$ and R$^{23}$ independently of one another are H or an unbranched or branched C$_1$-C$_4$ alkyl group;
W is O, NR$^{25}$, or N;
Y is 1 if W=O or NR$^{25}$, and is 2 if W=N;
A is C$_x$H$_{2x}$ with x=2, 3, 4, or 5, or CH$_2$CH(C$_6$H$_5$);
a is an integer from 2 to 350;
R$^{24}$ is H or an unbranched or branched C$_1$-C$_4$ alkyl group;
R$^{25}$ is H or an unbranched or branched C$_1$-C$_4$ alkyl group;

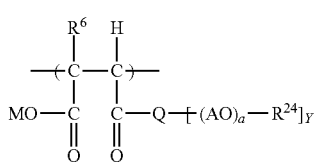

(IId)

in which
R$^6$ is H or an unbranched or branched C$_1$-C$_4$ alkyl group;
Q is NR$^{10}$, N, or O;
Y is 1 if Q=O or NR$^{10}$, and is 2 if Q=N;
R$^{10}$ is H or an unbranched or branched C$_1$-C$_4$ alkyl group;
A is C$_x$H$_{2x}$ with x=2, 3, 4, or 5, or CH$_2$C(C$_6$H$_5$)H;
R$^{24}$ is H or an unbranched or branched C$_1$-C$_4$ alkyl group;
M is H or one cation equivalent; and
a is an integer from 2 to 350.
10. The additive according to embodiment 9, wherein the polymeric dispersant as polyether side chain has:
(a) at least one structural unit of the formula (IIa) in which R$^{10}$ and R$^{12}$ are H, R$^{11}$ is H or CH$_3$, E and G together are a chemical bond, A is C$_x$H$_{2x}$ with x=2 and/or 3, a is 3 to 150, and R$^{13}$ is H or an unbranched or branched C$_1$-C$_4$ alkyl group; and/or (b) at least one structural unit of the formula (IIb) in which R$^{16}$ and R$^{18}$ are H, R$^{17}$ is H or CH$_3$, E is an unbranched or branched C$_1$-C$_6$ alkylene group, A is C$_x$H$_{2x}$ with x=2 and/or 3, L is C$_x$H$_{2x}$ with x=2 and/or 3, a is an integer from 2 to 150, d is an integer from 1 to 150, R$^{19}$ is H or an unbranched or branched C$_1$-C$_4$ alkyl group, and R$^{20}$ is H or an unbranched or branched C$_1$-C$_4$ alkyl group; and/or
(c) at least one structural unit of the formula (IIc) in which R$^{21}$ and R$^{23}$ are H, R$^{22}$ is H or CH$_3$, A is C$_x$H$_{2x}$ with x=2 and/or 3, a is an integer from 2 to 150, and R$^{24}$ is H or an unbranched or branched C$_1$-C$_4$ alkyl group; and/or
(d) at least one structural unit of the formula (IId) in which R$^6$ is H, Q is O, R$^7$ is (C$_n$H$_{2n}$)—O-(AO)$_\alpha$—R$^9$, n is 2 and/or 3, A is C$_x$H$_{2x}$ with x=2 and/or 3, $\alpha$ is an integer from 1 to 150, and R$^9$ is H or an unbranched or branched C$_1$-C$_4$ alkyl group.
11. The additive according to embodiment 9 or 10, wherein the polymeric dispersant comprises at least one structural unit of the formula (IIa) and/or (IIc).
12. The additive according to any of embodiments 1 to 4, wherein the polymeric dispersant is a polycondensate which comprises at least one aromatic or heteroaromatic structural unit having a polyether side chain, and at least one aromatic or heteroaromatic structural unit having at least one phosphoric ester group or a salt thereof.
13. The additive according to embodiment 5, wherein the dispersant comprises at least one polymer which is a polycondensation product comprising structural units (III) and (IV):

(III)

in which
T is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O, and S;
n is 1 or 2;
B is N, NH, or O, with the proviso that n is 2 if B is N and with the proviso that n is 1 if B is NH or O;
A is C$_x$H$_{2x}$ with x=2, 3, 4, or 5, or CH$_2$CH(C$_6$H$_5$);
a is an integer from 1 to 300;
R$^{25}$ is H, a branched or unbranched C$_1$ to C$_{10}$ alkyl radical, C$_5$ to C$_8$ cycloalkyl radical, aryl radical, or heteroaryl radical having 5 to 10 ring atoms, of which 1 or 2 atoms are heteroatoms selected from N, O, and S;
the structural unit (IV) being selected from the structural units (IVa) and (IVb):

(IVa)

in which
D is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O, and S;

E is N, NH, or O, with the proviso that m is 2 if E is N and with the proviso that m is 1 if E is NH or O;

A is $C_xH_{2x}$ with x=2, 3, 4, or 5, or $CH_2CH(C_6H_5)$;

b is an integer from 1 to 300;

M independently at each occurrence is H or one cation equivalent;

(IVb)

in which

V is a substituted or unsubstituted phenyl radical or a substituted or unsubstituted naphthyl radical;

$R^7$ is COOM, $OCH_2COOM$, $SO_3M$, or $OPO_3M_2$;

M is H or one cation equivalent;

the phenyl, naphthyl, or heteroaromatic radicals mentioned being optionally substituted by 1 or two radicals selected from $R^8$, OH, $OR^8$, $(CO)R^8$, COOM, $COOR^8$, $SO_3R^8$, and $NO_2$; and $R^8$ is $C_1$-$C_4$ alkyl, phenyl, naphthyl, phenyl-$C_1$-$C_4$ alkyl, or $C_1$-$C_4$ alkylphenyl.

14. The additive according to embodiment 13, wherein T is a substituted or unsubstituted phenyl radical or naphthyl radical, E is NH or OH, A is $C_xH_{2x}$ with x=2 and/or 3, a is an integer from 1 to 150, and $R^{25}$ is H or a branched or unbranched $C_1$ to $C_{10}$ alkyl radical.

15. The additive according to embodiment 13, wherein D is a substituted or unsubstituted phenyl radical or naphthyl radical, E is NH or O, A is $C_xH_{2x}$ with x=2 and/or 3, and b is an integer from 1 to 150.

16. The additive according to any of embodiments 13 to 15, wherein T and/or D are phenyl or naphthyl which is substituted by 1 or 2 $C_1$-$C_4$ alkyl, hydroxy or 2 $C_1$-$C_4$ alkoxy groups.

17. The additive according to embodiment 13, wherein V is phenyl or naphthyl which is substituted by 1 or 2 $C_1$-$C_4$ alkyl, OH, $OCH_3$, or COOM, and $R^7$ is COOM or $OCH_2COOM$.

18. The additive according to any of embodiments 13 to 17, wherein the polycondensation product comprises a further structural unit (V) of the formula

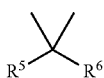
(V)

in which $R^5$ and $R^6$ may be identical or different and are H, $CH_3$, COOH, or a substituted or unsubstituted phenyl or naphthyl group, or are a substituted or unsubstituted heteroaromatic group having 5 to 10 ring atoms, of which 1 or 2 atoms are heteroatoms selected from N, O, and S.

19. The additive according to embodiment 18, wherein $R^5$ and $R^6$ may be the same or different and are H, $CH_3$, or COOH, more particularly H, or one of the radicals $R^5$ and $R^6$ is H and the other is $CH_3$.

20. The additive according to any of embodiments 1 to 11, wherein the polymeric dispersant has units of the formulae (I) and (II), more particularly of the formulae (Ia) and (IIa).

21. The additive according to embodiment 20, wherein the polymeric dispersant has structural units of the formulae (Ia) and (IIc).

22. The additive according to embodiment 20, wherein the polymeric dispersant has structural units of the formulae (Ic) and (IIa).

23. The additive according to embodiment 20, wherein the polymeric dispersant has structural units of the formulae (Ia), (Ic), and (IIa).

24. The additive according to any of embodiments 1 to 11 or 20 to 23, wherein the polymeric dispersant is composed of (i) anionic or anionogenic structural units derived from acrylic acid, methacrylic acid, maleic acid, hydroxyethyl acrylate phosphoric esters, and/or hydroxyethyl methacrylate phosphoric esters, hydroxyethyl acrylate phosphoric diesters, and/or hydroxyethyl methacrylate phosphoric diesters, and (ii) polyether side chain structural units derived from $C_1$-$C_4$ alkyl-polyethylene glycol acrylic esters, polyethylene glycol acrylic esters, $C_1$-$C_4$ alkyl-polyethylene glycol methacrylic esters, polyethylene glycol methacrylic esters, polyethylene glycol acrylic esters, vinyloxy-$C_2$-$C_4$ alkylene-polyethylene glycol, vinyloxy-$C_2$-$C_4$ alkylene-polyethylene glycol $C_1$-$C_4$ alkyl ethers, allyloxy-polyethylene glycol, allyloxy-polyethylene glycol $C_1$-$C_4$ alkyl ethers, methallyloxy-polyethylene glycol, methallyloxy-polyethylene glycol $C_1$-$C_4$ alkyl ethers, isoprenyloxy-polyethylene glycol and/or isoprenyloxy-polyethylene glycol $C_1$-$C_4$ alkyl ethers.

25. The additive according to embodiment 24, wherein the polymeric dispersant is composed of structural units (i) and (ii) derived from
   (i) hydroxyethyl acrylate phosphoric esters and/or hydroxyethyl methacrylate phosphoric esters and (ii) $C_1$-$C_4$ alkyl-polyethylene glycol acrylic esters and/or $C_1$-$C_4$ alkyl-polyethylene glycol methacrylic esters; or
   (i) acrylic acid and/or methacrylic acid and (ii) $C_1$-$C_4$ alkyl-polyethylene glycol acrylic esters and/or $C_1$-$C_4$ alkyl-polyethylene glycol methacrylic esters; or
   (i) acrylic acid, methacrylic acid and/or maleic acid and (ii) vinyloxy-$C_2$-$C_4$ alkylene-polyethylene glycol, allyloxy-polyethylene glycol, methallyloxy-polyethylene glycol and/or isoprenyloxy-polyethylene glycol.

26. The additive according to embodiment 25, wherein the polymeric dispersant is composed of structural units (i) and (ii) derived from
   (i) hydroxyethyl methacrylate phosphoric esters and (ii) $C_1$-$C_4$ alkyl-polyethylene glycol methacrylic esters or polyethylene glycol methacrylic esters; or
   (i) methacrylic acid and (ii) $C_1$-$C_4$ alkyl-polyethylene glycol methacrylic esters or polyethylene glycol methacrylic esters; or
   (i) acrylic acid and maleic acid and (ii) vinyloxy-$C_2$-$C_4$ alkylene-polyethylene glycol or
   (i) acrylic acid and maleic acid and (ii) isoprenyloxy-polyethylene glycol or
   (i) acrylic acid and (ii) vinyloxy-$C_2$-$C_4$ alkylene-polyethylene glycol or
   (i) acrylic acid and (ii) isoprenyloxy-polyethylene glycol or
   (i) acrylic acid and (ii) methallyloxy-polyethylene glycol or
   (i) maleic acid and (ii) isoprenyloxy-polyethylene glycol or (i) maleic acid and (ii) allyloxy-polyethylene glycol or (i) maleic acid and (ii) methallyloxy-polyethylene glycol.

27. The additive according to any of embodiments 5 to 11, wherein the molar ratio of structural units (I):(II) is 1:4 to 15:1, more particularly 1:1 to 10:1.

28. The additive according to any of embodiments 13 to 19, wherein the molar ratio of structural units (III):(IV) is 4:1 to 1:15, more particularly 2:1 to 1:10.

29. The additive according to embodiments 13 to 20, wherein the molar ratio of structural units (III+IV):(V) is 2:1 to 1:3, more particularly 1:0.8 to 1:2.

30. The additive according to any of embodiments 13 to 20, 28 or 29, wherein the polymeric dispersant is composed of structural units of the formulae (III) and (IV) in which T and D are phenyl or naphthyl, the phenyl or naphthyl being optionally substituted by 1 or 2 $C_1$-$C_4$ alkyl, hydroxy or 2 $C_1$-$C_4$ alkoxy groups, B and E are 0, A is $C_xH_{2x}$ with x=2, a is 3 to 150, more particularly 10 to 150, and b is 1, 2, or 3.

31. The additive according to any of the preceding embodiments, in the form of an aqueous suspension or in solid form, more particularly as powder.

32. The additive according to embodiment 31, having in solid form a water content of less than 10 wt %.

33. The additive according to any of the preceding embodiments, wherein the molar ratio of calcium to silicon in the calcium silicate hydrate particles is 0.6 to 2, preferably 0.8 to 1.8, more preferably 0.9 to 1.6, more particularly preferably 1.0 to 1.5.

34. The additive according to any of the preceding embodiments, wherein the molar ratio of calcium to water in the calcium silicate hydrate particles is 0.6 to 6, preferably 0.6 to 4, more preferably 0.8 to 2.

35. The additive according to any of the preceding embodiments, further comprising formulating auxiliaries selected more particularly from defoamers, air entrainers, solidification retardants, shrinkage reducers, redispersible powders, other hardening accelerators, frost preventatives, antiefflorescence agents, and mixtures of two or more thereof.

36. The additive according to any of the preceding embodiments, wherein the calcium silicate hydrate particles have been prepared in the presence of the polymeric dispersant.

37. The additive according to any of the preceding embodiments, obtainable by reaction of a calcium salt of at least one sulfonic acid compound of the formula (1) with at least one water-soluble inorganic silicate compound in the presence of an aqueous solution of the dispersant.

38. The additive according to embodiment 37, wherein the calcium salt of the sulfonic acid compound is obtainable by reaction of a water-soluble calcium salt with a compound of the formula I in which K is H and n is 1, this compound being used in not more than the stoichiometric amount based on the calcium salt.

39. The additive according to either of embodiments 5 and 6, where the dispersant is not exclusively constructed of units of the formula (Ia) in which X is a chemical bond and $R^2$ is M, and of the formula (IIc), or comprises no units of the formula (IIc) when it comprises units of the formula (Ia) in which X is a chemical bond and $R^2$ is M.

40. A process for preparing an additive according to any of embodiments 1 to 39, by reacting at least one sulfonic acid compound of the formula (I) in which $K^{n+}$ is $Ca^{2+}$ with at least one water-soluble inorganic silicate compound in the presence of an aqueous solution of a dispersant.

41. The process according to embodiment 40, wherein the sulfonic acid compound of the formula (I) is obtainable by reaction of a water-soluble calcium salt with a compound of the formula in which $K^{n+}$ is $H^+$, this compound being used in not more than the stoichiometric amount based on the calcium salt.

42. A process for preparing an additive according to any of embodiments 1 to 39, by reacting a water-soluble calcium compound with at least one water-soluble inorganic silicate compound in the presence of an aqueous solution of a dispersant, and adding at least one sulfonic acid compound of the formula (I).

43. The process according to embodiment 42, wherein the water-soluble calcium compound is selected from calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium oxide, calcium hypochlorite, calcium iodate, calcium iodide, calcium lactate, calcium nitrite, calcium oxalate, calcium phosphate, calcium propionate, calcium silicate, calcium stearate, calcium sulfate, calcium sulfate hemihydrate, calcium sulfate dihydrate, calcium sulfide, calcium tartrate, calcium aluminate, and mixtures of two or more of these components.

44. The process according to embodiment 43, wherein the water-soluble calcium compound is selected from calcium citrate, calcium acetate, calcium formate, calcium sulfate, and mixtures of two or more of these components.

45. The process according to embodiment 43, wherein the water-soluble calcium compound is selected from calcium chloride and calcium nitrate or mixtures thereof.

46. The process according to any of embodiments 40 to 45, wherein the water-soluble silicate compound is selected from sodium silicate, potassium silicate, waterglass, aluminum silicate, calcium silicate, silicic acid, sodium metasilicate, potassium metasilicate, and mixtures of two or more of these components.

47. The process according to embodiment 45, wherein the water-soluble silicate compound is selected from an alkali metal silicate of the formula m $SiO_2$.n $M_2O$, wherein M is Li, Na, K, and $NH_4$, preferably Na or K, or mixtures thereof, m and n are molar numbers, and the ratio m:n is from about 0.9 to about 4, preferably about 0.9 to about 3.8, and more particularly about 0.9 to about 3.6.

48. The process according to any of embodiments 40 to 47, comprising an additional process step of drying the hardening accelerator composition, the drying taking place preferably by spray drying or roll drying.

49. The use of an additive according to any of embodiments 1 to 39 in building material mixtures which comprise a hydraulic binder.

50. The use of an additive according to any of embodiments 1 to 39 as admixture for hydraulic binders.

51. The use of an additive according to any of embodiments 1 to 39 as a setting accelerator for hydraulic binders.

52. The use according to any of embodiments 49 to 51, wherein the hydraulic binder is selected from (portland) cement, gypsum, anhydrite, slag, preferably granulated blast furnace slag, slag sands, flyashes, finely ground silica, metakaolin, natural and artificial pozzolans, calcined oil shale, calcium sulfoaluminate cement, calcium aluminate cement, and mixtures of two or more of these components.

53. The use of a water-soluble calcium sulfonic acid salt of the formula (I) according to embodiment 4 for producing calcium silicate hydrate particles.

54. The use of a water-soluble calcium sulfonic acid salt of the formula (I) according to embodiment 4 for producing the additive according to any of embodiments 1 to 39.
55. The use of a water-soluble calcium sulfonic acid salt of the formula (I) according to embodiment 4 as drying assistant.
56. The use of an additive according to any of embodiments 1 to 39 as grinding assistant in the production of (portland) cement, slag, flyash, lime, pozzolans, or a mixture thereof, preferably for (portland) cement.
57. The use of an additive according to any of embodiments 1 to 39 in mineral-oil and natural-gas wells, more particularly in the development, exploitation, and completion of underground mineral-oil and natural-gas deposits, and also in deep bores.
58. The use of an additive according to embodiment 57 to accelerate the setting of the cement slurries in the borehole cementing of mineral-oil and natural-gas wells.
59. A building material mixture comprising an additive according to any of embodiments 1 to 39 and a hydraulic binder.
60. The building material mixture according to embodiment 59, wherein the hydraulic binder is selected from (portland) cement, blast furnace slag, slag sand, flyash, silica dust, metakaolin, natural pozzolans, calcined oil shale, calcium aluminate cement, and mixtures thereof.
61. The building material mixture according to embodiment 59 or 60, comprising (portland) cement as hydraulic binder.
62. The building material mixture according to any of embodiments 59 to 61, in the form of an aqueous suspension.

In accordance with one embodiment of the invention, the particle diameter—as determined by dynamic light scattering (Malvern Zetasizer NanoZS) on the suspension according to the invention—of 90% of the calcium silicate hydrate particles is smaller than 1000 nm, preferably smaller than 500 nm, more preferably smaller than 300 nm, and very preferably smaller than 200 nm.

The term "sulfonic acid compound" is applied to all those compounds which have a structural unit —$SO_3$— in which all three oxygen atoms are linked directly to the sulfur atom. In particular, the term "sulfonic acid compound" is not confined to sulfonic acids, and also embraces the salts thereof that contain sulfonic acid anions.

The sulfonic acid compound is more particularly a compound of the formula (I)
in which

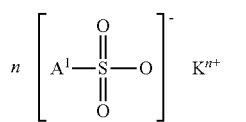

$A^1$ is $NH_2$, NHMe, $NMe_2$, $N(CH_2$—$CH_2$—$OH)_2$ $CH_3$, $C_2H_5$, $CH_2$—$CH_2$—OH, phenyl or p-$CH_3$-phenyl, and
$K^{n+}$ is an alkali metal cation, more particularly $Na^+$, $K^+$, or one equivalent of a cation selected from $Ca^{2+}$, $Mg^{2+}$, $Sr^{2+}$, $Ba^{2+}$, $Zn^{2+}$, $Fe^{2+}$, $Fe^{3+}$, $Al^{3+}$, $Mn^{2+}$, and/or $Cu^{2+}$.

In one particularly preferred embodiment the anion of the formula (I) is selected from amidosulfonate ($H_2N$—$SO_3^-$) and methylsulfonate ($H_3C$—$SO_3^-$). With more particular preference the anion of the formula (I) is the amidosulfonate ($H_2N$—$SO_3^-$).

In one preferred embodiment the dispersant comprises at least one polymer which comprises structural units having anionic and/or anionogenic groups and structural units having polyether side chains. More particularly it is possible to use polymers which at more or less regular intervals on a linear main chain have relatively long side chains (having a molecular weight of in each case at least 200 g/mol, more preferably at least 400 g/mol). The lengths of these side chains are frequently approximately the same, but may also differ greatly from one another (when, for example, polyether macromonomers having side chains of different lengths are copolymerized). Polymers of these kinds are obtainable, for example, by radical polymerization of acid monomers and polyether macromonomers. An alternative route to comb polymers of this kind is the esterification and/or amidation of poly(meth)acrylic acid and similar (co)polymers, such as acrylic acid/maleic acid copolymers, for example, with suitable monohydroxy-functional or monoamino-functional polyalkylene glycols, respectively, preferably alkyl polyethylene glycols. Comb polymers obtainable by esterification and/or amidation of poly(meth)acrylic acid are described for example in EP 1138697B1, hereby incorporated by reference.

The average molecular weight $M_w$ of the polymer as determined by gel permeation chromatography (GPC) is preferably 5000 to 200 000 g/mol, more preferably 10 000 to 80 000 g/mol, and very preferably 20 000 to 70 000 g/mol. The average molecular weight of the polymers and the conversion were analyzed by means of GPC (column combinations: OH-Pak SB-G, OH-Pak SB 804 HQ and OH-Pak SB 802.5 HQ from Shodex, Japan; eluent: 80 vol % aqueous solution of $HCO_2NH_4$ (0.05 mol/l) and 20 vol % acetonitrile; injection volume 100 μl; flow rate 0.5 ml/min). Calibration for the purpose of determining the average molar mass was carried out with linear poly(ethylene oxide) standards and polyethylene glycol standards. As a measure of the conversion the peak of the copolymer is standardized to a relative height of 1, and the height of the peak of the unreacted macromonomer/PEG-containing oligomer is used as a measure of the residual monomer content.

The polymeric dispersant preferably meets the requirements of industrial standard EN 934-2 (February 2002).

The polymer preferably comprises, as anionic or anionogenic group, at least one structural unit of the general formulae (Ia), (Ib), (Ic) and/or (Id):

in which
$R^1$ is H or an unbranched or branched $C_1$-$C_4$ alkyl group, $CH_2COOH$, or $CH_2CO$—X—$R^3$, preferably H or $CH_3$;
X is NH—($C_nH_{2n}$) or O($C_nH_{2n}$) with n=1, 2, 3, or 4, the nitrogen atom or the oxygen atom being bonded to the CO group, or is a chemical bond, preferably X=chemical bond or O($C_nH_{2n}$);

$R^2$ is OM, $PO_3M_2$, or O—$PO_3M_2$; with the proviso that X is a chemical bond if $R^2$ is OM;
$R^3$ is $PO_3M_2$ or O—$PO_3M_2$;

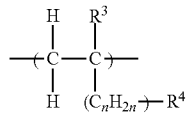
(Ib)

in which
$R^3$ is H or an unbranched or branched $C_1$-$C_4$ alkyl group, preferably H or $CH_3$;
n is 0, 1, 2, 3, or 4, preferably 0 or 1;
$R^4$ is $PO_3M_2$ or O—$PO_3M_2$;

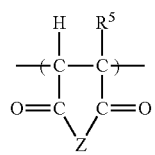
(Ic)

in which
$R^5$ is H or an unbranched or branched $C_1$-$C_4$ alkyl group, preferably H;
Z is O or $NR^7$, preferably O; and
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$,
n is 1, 2, 3, or 4, preferably 1, 2, or 3;

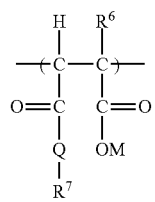
(Id)

in which
$R^6$ is H or an unbranched or branched $C_1$-$C_4$ alkyl group, preferably H;
Q is $NR^7$ or O, preferably O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$,
n is 1, 2, 3, or 4, preferably 1, 2, or 3; and
each M independently of any other is H or one cation equivalent.

The polymer further preferably comprises, as anionic or anionogenic group, at least one structural unit of the formula (Ia), in which $R^1$ is H or $CH_3$; and/or at least one structural unit of the formula (Ib) in which $R^3$ is H or $CH_3$; and/or at least one structural unit of the formula (Ic) in which $R^5$ is H or $CH_3$ and Z is O; and/or at least one structural unit of the formula (Id) in which $R^6$ is H and Q is O.

More preferably the polymer comprises, as anionic or anionogenic group, at least one structural unit of the formula (Ia) in which $R^1$ is H or $CH_3$ and $XR^2$ is OM or X is $O(C_nH_{2n})$ with n=1, 2, 3, or 4, more particularly 2, and $R^2$ is O—$PO_3M_2$.

The polymer preferably comprises as polyether side chain at least one structural unit of the general formulae (IIa), (IIb), (IIc) and/or (IId):

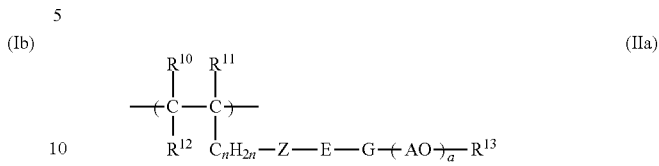
(IIa)

in which
$R^{10}$, $R^{11}$, and $R^{12}$ independently of one another are H or an unbranched or branched $C_1$-$C_4$ alkyl group;
Z is O or S;
E is an unbranched or branched $C_1$-$C_6$ alkylene group, a cyclohexylene group, $CH_2$—$C_6H_{10}$, 1,2-phenylene, 1,3-phenylene, or 1,4-phenylene;
G is O, NH, or CO—NH; or
E and G together are a chemical bond;
A is $C_xH_{2x}$ with x=2, 3, 4, or 5, or $CH_2CH(C_6H_5)$, preferably 2 or 3;
n is 0, 1, 2, 3, 4, and/or 5, preferably 0, 1, or 2;
a is an integer from 2 to 350, preferably 5 to 150;
$R^{13}$ is H, an unbranched or branched $C_1$-$C_4$ alkyl group; CO—$NH_2$ and/or $COCH_3$;

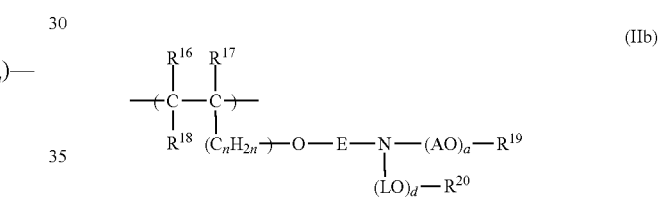
(IIb)

in which
$R^{16}$, $R^{17}$, and $R^{18}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene, or 1,4-phenylene, or is a chemical bond;
A is $C_xH_{2x}$ with x=2, 3, 4, or 5, or $CH_2CH(C_6H_5)$, preferably 2 or 3;
L is $C_xH_{2x}$ with x=2, 3, 4, or 5, or $CH_2$—$CH(C_6H_5)$, preferably 2 or 3;
a is an integer from 2 to 350, preferably 5 to 150;
d is an integer from 1 to 350, preferably 5 to 150;
$R^{19}$ is H or an unbranched or branched $C_1$-$C_4$ alkyl group;
$R^{20}$ is H or an unbranched or branched $C_1$-$C_4$ alkyl group; and
n is 0, 1, 2, 3, 4, or 5, preferably 0, 1, or 2;

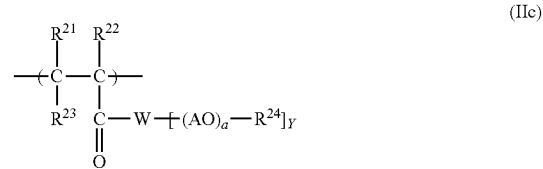
(IIc)

in which

R²¹, R²², and R²³ independently of one another are H or an unbranched or branched $C_1$-$C_4$ alkyl group;

W is O, NR²⁵, or N;

Y is 1 if W=O or NR²⁵, and is 2 if W=N;

A is $C_xH_{2x}$ with x=2, 3, 4, or 5, or $CH_2CH(C_6H_5)$, preferably 2 or 3;

a is an integer from 2 to 350, preferably 5 to 150;

R²⁴ is H or an unbranched or branched $C_1$-$C_4$ alkyl group;

R²⁵ is H or an unbranched or branched $C_1$-$C_4$ alkyl group;

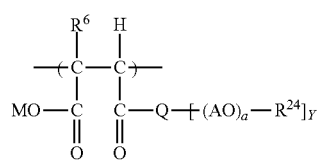
(IId)

in which

R⁶ is H or an unbranched or branched $C_1$-$C_4$ alkyl group;

Q is NR¹⁰, N, or O;

Y is 1 if W=O or NR¹⁰, and is 2 if W=N;

R¹⁰ is H or an unbranched or branched $C_1$-$C_4$ alkyl group;

R²⁴ is H or an unbranched or branched $C_1$-$C_4$ alkyl group;

M is H or one cation equivalent;

A is $C_xH_{2x}$ with x=2, 3, 4, or 5, or $CH_2C(C_6H_5)H$, preferably 2 or 3; and a is an integer from 2 to 350, preferably 5 to 150.

With further preference the polymer comprises as polyether side chain (a) at least one structural unit of the formula (IIa) in which R¹⁰ and R¹² are H, R¹¹ is H or $CH_3$, E and G together are a chemical bond, A is $C_xH_{2x}$ with x=2 and/or 3, a is 3 to 150, and R¹³ is H or an unbranched or branched $C_1$-$C_4$ alkyl group; and/or (b) at least one structural unit of the formula (IIb) in which R¹⁶ and R¹⁸ are H, R¹⁷ is H or $CH_3$, E is an unbranched or branched $C_1$-$C_6$ alkylene group, A is $C_xH_{2x}$ with x=2 and/or 3, L is $C_xH_{2x}$ with x=2 and/or 3, a is an integer from 2 to 150, d is an integer from 1 to 150, R¹⁹ is H or an unbranched or branched $C_1$-$C_4$ alkyl group, and R²⁰ is H or an unbranched or branched $C_1$-$C_4$ alkyl group; and/or (c) at least one structural unit of the formula (IIc) in which R²¹ and R²³ are H, R²² is H or $CH_3$, A is $C_xH_{2x}$ with x=2 and/or 3, a is an integer from 2 to 150, and R²⁴ is H or an unbranched or branched $C_1$-$C_4$ alkyl group; and/or (d) at least one structural unit of the formula (IId) in which R⁶ is H, Q is O, R⁷ is $(C_nH_{2n})$—O-$(AO)_\alpha$—R⁹, n is 2 and/or 3, A is $C_xH_{2x}$ with x=2 and/or 3, α is an integer from 1 to 150, and R⁹ is H or an unbranched or branched $C_1$-$C_4$ alkyl group.

With particular preference the polymer comprises at least one structural unit of the formula (IIa) and/or (IIc).

According to a further embodiment, the polymeric dispersant is a polycondensation product which comprises at least one aromatic or heteroaromatic structural unit having a polyether side chain, and at least one aromatic or heteroaromatic structural unit having at least one phosphoric ester group or a salt thereof.

The polycondensation product preferably comprises structural units (III) and (IV):

(III)

in which

T is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O, and S;

n is 1 or 2;

B is N, NH, or O, with the proviso that n is 2 if B is N and with the proviso that n is 1 if B is NH or O;

A is $C_xH_{2x}$ with x=2, 3, 4, or 5, or $CH_2CH(C_6H_5)$, preferably 2 or 3;

a is an integer from 1 to 300, preferably 5 to 150;

R²⁵ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O, and S, preferably is H;

the structural unit (IV) being selected from the structural units (IVa) and (IVb):

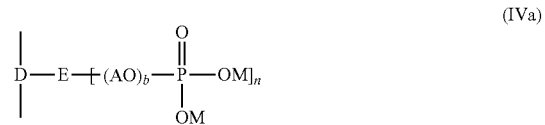
(IVa)

in which

D is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O, and S;

E is N, NH, or O, with the proviso that m is 2 if E is N and with the proviso that n is 1 if E is NH or O;

A is $C_xH_{2x}$ with x=2, 3, 4, or 5, or $CH_2CH(C_6H_5)$, preferably 2 or 3;

b is an integer from 1 to 300, preferably 5 to 150;

M independently at each occurrence is H or one cation equivalent;

(IVb)

in which

V is a substituted or unsubstituted phenyl radical or a substituted or unsubstituted naphthyl radical; and is optionally substituted by 1 or two radicals selected from R⁸, OH, OR⁸, (CO)R⁸, COOM, COOR⁸, $SO_3R^8$, and $NO_2$, preferably OH, $OC_1C_4$ alkyl, and $C_1$-$C_4$ alkyl;

R⁷ is COOM, $OCH_2COOM$, $SO_3M$, or $OPO_3M_2$;

M is H or one cation equivalent;

the phenyl, naphthyl, or heteroaromatic radicals mentioned being optionally substituted by 1 or two radicals selected from $R^8$, OH, $OR^8$, $(CO)R^8$, COOM, $COOR^8$, $SO_3R^8$, and $NO_2$; and $R^8$ is $C_1$-$C_4$ alkyl, phenyl, naphthyl, phenyl-$C_1$-$C_4$ alkyl, or $C_1$-$C_4$ alkylphenyl.

With further preference the polymer comprises a polycondensation product comprising structural units (III) and (IV) wherein T is a substituted or unsubstituted phenyl radical or naphthyl radical, E is NH or O, A is $C_xH_{2x}$ with x=2 and/or 3, a is an integer from 1 to 150, and $R^{25}$ is H or a branched or unbranched $C_1$ to $C_{10}$ alkyl radical.

With further preference the polymer comprises a polycondensation product comprising structural units (III) and (IV) wherein D is a substituted or unsubstituted phenyl radical or naphthyl radical, E is NH or O, A is $C_xH_{2x}$ with x=2 and/or 3, and b is an integer from 1 to 150.

With particular preference the polymer comprises a polycondensation product comprising structural units (III) and (IV) wherein T and/or D are phenyl or naphthyl which is substituted by 1 or 2 $C_1$-$C_4$ alkyl, hydroxy or 2 $C_1$-$C_4$ alkoxy groups.

The polycondensation product may comprise structural units (IVb) wherein V is phenyl or naphthyl which is substituted by 1 or 2 $C_1$-$C_4$ alkyl, OH, $OCH_3$, or COOM, and $R^7$ is COOM or $OCH_2COOM$.

The polycondensation product may comprise a further structural unit (V), derived from the corresponding carbonyl compound, and of the formula in which

(V)

$R^5$ and $R^6$ may be identical or different and are H, $CH_3$, COOH, or a substituted or unsubstituted phenyl or naphthyl group, or are a substituted or unsubstituted heteroaromatic group having 5 to 10 ring atoms, of which 1 or 2 atoms are heteroatoms selected from N, O, and S.

Preferably $R^5$ and $R^6$ in the structural unit (V) are identical or different and are H, $CH_3$, or COOH, more particularly H, or one of the radicals $R^5$ and $R^6$ is H and the other is $CH_3$.

The structural units (III) are preferably derived from alkoxylated, hydroxyl- or amino-functionalized aromatics or heteroaromatics, examples being alkoxylated phenoxyethanol, phenoxypropanol, 2-alkoxyphenoxyethanols, 4-alkoxyphenoxyethanols, 2-alkylphenoxyethanols and 4-alkylphenoxyethanols, N,N-(dihydroxyethyl)aniline, N-(hydroxyethyl)aniline, N,N-(dihydroxypropyl)aniline, and N-(hydroxypropyl)aniline. Particularly preferred are alkoxylated phenol derivatives (for example, phenoxyethanol or phenoxypropanol), very preferably alkoxylated, more particularly ethoxylated, phenol derivatives with a weight-average molecular weight of between 300 g/mol and 10 000 g/mol (for example, polyethylene glycol monophenyl ether).

The structural units (IV) are preferably derived from phosphated, alkoxylated, hydroxyl- or amino-functionalized aromatics or heteroaromatics, examples being phenoxyethanol phosphate, polyethylene glycol monophenyl ether phosphates, N,N-(dihydroxyethyl)aniline diphosphate, N,N-(dihydroxyethyl)aniline phosphate, N-(hydroxypropyl)aniline phosphate, which have at least one phosphoric ester group and/or a salt of the phosphoric ester group (e.g., by esterification with phosphoric acid and optional addition of bases). Particularly preferred are alkoxylated phenols having at least one phosphoric ester group and/or a salt of the phosphoric ester group (for example, polyethylene glycol monophenyl ether phosphates with less than 25 ethylene glycol units), and very particular preference is given to the respective alkoxylated phenols having weight-average molecular weights of between 200 g/mol and 600 g/mol (for example, phenoxyethanol phosphate, polyethylene glycol monophenyl ether phosphates having 2 to 10 ethylene glycol units), the alkoxylated phenols having at least one phosphoric ester group and/or a salt of the phosphoric ester group (e.g., by esterification with phosphoric acid and optional addition of bases).

The structural units (V) are preferably derived from formaldehyde, acetaldehyde, acetone, glyoxylic acid, and/or benzaldehyde. Formaldehyde is preferred.

In one embodiment, the polymer comprises structural units of the formulae (I) and (II), more particularly of the formulae (Ia) and (IIa).

In another embodiment the polymer comprises structural units of the formulae (Ia) and (IIc).

In another embodiment the polymer comprises structural units of the formulae (Ic) and (IIa).

In another embodiment the polymer comprises structural units of the formulae (Ia), (Ic), and (IIa).

The polymer may be composed of (i) anionic or anionogenic structural units derived from acrylic acid, methacrylic acid, maleic acid, hydroxyethyl acrylate phosphoric esters, and/or hydroxyethyl methacrylate phosphoric esters, hydroxyethyl acrylate phosphoric diesters, and/or hydroxyethyl methacrylate phosphoric diesters, and (ii) polyether side chain structural units derived from $C_1$-$C_4$ alkyl-polyethylene glycol acrylic esters, polyethylene glycol acrylic esters, $C_1$-$C_4$ alkyl-polyethylene glycol methacrylic esters, polyethylene glycol methacrylic esters, polyethylene glycol acrylic esters, vinyloxy-$C_2$-$C_4$ alkylene-polyethylene glycol, vinyloxy-$C_2$-$C_4$ alkylene-polyethylene glycol $C_1$-$C_4$ alkyl ethers, allyloxy-polyethylene glycol, allyloxy-polyethylene glycol $C_1$-$C_4$ alkyl ethers, methallyloxy-polyethylene glycol, methallyloxy-polyethylene glycol $C_1$-$C_4$ alkyl ethers, isoprenyloxy-polyethylene glycol and/or isoprenyloxy-polyethylene glycol $C_1$-$C_4$ alkyl ethers.

The polymer is preferably composed of structural units (i) and (ii) derived from (i) hydroxyethyl acrylate phosphoric esters and/or hydroxyethyl methacrylate phosphoric esters and (ii) $C_1$-$C_4$ alkyl-polyethylene glycol acrylic esters and/or $C_1$-$C_4$ alkyl-polyethylene glycol methacrylic esters; or (i) acrylic acid and/or methacrylic acid and (ii) $C_1$-$C_4$ alkyl-polyethylene glycol acrylic esters and/or $C_1$-$C_4$ alkyl-polyethylene glycol methacrylic esters; or (i) acrylic acid, methacrylic acid and/or maleic acid and (ii) vinyloxy-$C_2$-$C_4$ alkylene-polyethylene glycol, allyloxy-polyethylene glycol, methallyloxy-polyethylene glycol and/or isoprenyloxy-polyethylene glycol.

With particular preference the polymer is composed of structural units (i) and (ii) derived from (i) hydroxyethyl methacrylate phosphoric esters and (ii) $C_1$-$C_4$ alkyl-polyethylene glycol methacrylic esters or polyethylene glycol methacrylic esters; or (i) methacrylic acid and (ii) $C_1$-$C_4$ alkyl-polyethylene glycol methacrylic esters or polyethylene glycol methacrylic esters; or (i) acrylic acid and maleic acid and (ii) vinyloxy-$C_2$-$C_4$ alkylene-polyethylene glycol or (i) acrylic acid and maleic acid and (ii) isoprenyloxy-polyethylene glycol or
(i) acrylic acid and (ii) vinyloxy-$C_2$-$C_4$ alkylene-polyethylene glycol or
(i) acrylic acid and (ii) isoprenyloxy-polyethylene glycol or
(i) acrylic acid and (ii) methallyloxy-polyethylene glycol or
(i) maleic acid and (ii) isoprenyloxy-polyethylene glycol or
(i) maleic acid and (ii) allyloxy-polyethylene glycol or
(i) maleic acid and (ii) methallyloxy-polyethylene glycol.

In one embodiment the molar ratio of structural units (I):(II) is 1:4 to 15:1, more particularly 1:1 to 10:1.

In another embodiment the molar ratio of structural units (III):(IV) is 4:1 to 1:15, more particularly 2:1 to 1:10.

In another embodiment the molar ratio of structural units (III+IV):(V) is 2:1 to 1:3, more particularly 1:0.8 to 1:2.

In one particularly preferred embodiment the polymer comprises a polycondensation product composed of structural units of the formulae (III) and (IV) in which T and D are phenyl or naphthyl, the phenyl or naphthyl being optionally substituted by 1 or 2 $C_1$-$C_4$ alkyl, hydroxy or 2 $C_1$-$C_4$ alkoxy groups, B and E are O, A is $C_xH_{2x}$ with x=2, a is 3 to 150, more particularly 10 to 150, and b is 1, 2, or 3.

The polymeric dispersants which comprise the structural units (I) and (II) are prepared in a customary way, as for example by radical polymerization. This is described for example in EP0894811, EP1851256, EP2463314, EP0753488, hereby incorporated in full by reference.

The polymeric dispersants which comprise the structural units (III), (IV), and (V) are typically prepared by a process in which the compounds forming the bases for the structural units (III), (IV), and (V) are reacted with one another in a polycondensation. The preparation of the polycondensates is described for example in US 2008/0108732, WO 2006/042709, and WO 2010/026155, hereby incorporated in full by reference.

The additive may take the form of an aqueous suspension or, after drying, the form of a dry product, such as a piece material, a powderous material, a bulk material and/or a powder, preferably a powder. If the additive is present in suspension form, the compound of the formula (I) may be present in dissolved or suspended form. As a dry product, the additive has a water content of less than 15 wt %, preferably of less than 10 wt %, more preferably of less than 7 wt %.

The water content is ascertained by determining the loss of mass of the powder at 100° C., by storing 1 g of powder in a forced-air drying cabinet at 100° C. for 3 hours.

The term "calcium silicate hydrate" also encompasses calcium silicate hydrate containing foreign ions, such as magnesium and aluminum cations, for example.

The composition of the C—S—H particles can be described in general by the following empirical formula:

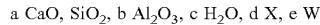

X is an alkali metal
W is an alkaline earth metal

| | | |
|---|---|---|
| $0.1 \leq a \leq 2$ | preferably | $0.66 \leq a \leq 1.8$ |
| $0 \leq b \leq 1$ | preferably | $0 \leq b \leq 0.1$ |
| $1 \leq c \leq 6$ | preferably | $1 \leq c \leq 6.0$ |
| $0 \leq d \leq 1$ | preferably | $0 \leq d \leq 0.4$ |
| $0 \leq e \leq 2$ | preferably | $0 \leq e \leq 0.1$ |

In one preferred embodiment the aqueous solution, in addition to silicate ions and calcium ions, comprises further dissolved ions, provided preferably in the form of dissolved aluminum salts and/or dissolved magnesium salts. Aluminum salts used may be, preferably, aluminum halide, aluminum nitrate, aluminum hydroxide and/or aluminum sulfate. Within the aluminum halides group, aluminum chloride is particularly preferred. The magnesium salts may be, preferably, magnesium nitrate, magnesium chloride and/or magnesium sulfate. The advantage of the aluminum salts and magnesium salts is that as a result of the introduction of ions other than calcium and silicon, defects can be generated in the calcium silicate hydrate. This leads to an improved effect on accelerating hardening. The molar ratio of aluminum and/or magnesium to calcium and silicon is preferably small. More preferably the molar ratios are selected such that in the empirical formula above, the preferred ranges for a, b, and e are fulfilled ($0.66 \leq a \leq 1.8$; $0 \leq b \leq 0.1$; $0 \leq e \leq 0.1$).

The calcium silicate hydrate particles are typically present at least partly in one or more of the following crystal structures: foshagite, hillebrandite, xonotlite, nekoite, clinotobermorite, 9Å-tobermorite (riversiderite), 11Å-tobermorite, 14Å-tobermorite (plombierite), jennite, metajennite, calcium chondrodite, afwillite, $\alpha$-$C_2SH$, dellaite, jaffeite, rosenhahnite, killalaite and/or suolunite.

With particular preference the calcium silicate hydrate particles are in the form of xonotlite, 9Å-tobermorite (riversiderite), 11Å-tobermorite, 14Å-tobermorite (plombierite), jennite, metajennite, afwillite and/or jaffeite.

The molar ratio of calcium to silicon in the calcium silicate hydrate particles of the additive for hydraulically setting compositions is 0.6 to 2, preferably 0.8 to 1.8, more preferably 0.9 to 1.6, more particularly preferably 1.0 to 1.5.

The molar ratio of calcium to water in the calcium silicate hydrate particles of the additive for hydraulically setting compositions is 0.6 to 6, preferably 0.6 to 4, more preferably 0.8 to 2. These molar ratios are similar to those found, for example, in calcium silicate hydrate phases formed by hydration of cement.

The additive in suspension form for hydraulically setting compositions preferably comprises
i) 0.1 to 20 wt %, preferably 1 to 15 wt %, and very preferably 3 to 10 wt % of the calcium silicate hydrate particles,
ii) 0.1 to 30 wt %, preferably 1 to 20 wt %, and very preferably 1 to 10 wt % of the dispersant,
iii) 1 to 30 wt %, preferably 5 to 25 wt %, and very preferably 10 to 20 wt % of the sulfonic acid compound, and
iv) 24 to 99 wt %, more preferably 50 to 99 wt %, and very preferably 60 to 90 wt % of water.

With particular preference the additive is in powder form and then comprises:
i) 10 to 70 wt %, preferably 20 to 50 wt %, and very preferably 20 to 30 wt % of the calcium silicate hydrate particles,
ii) 5 to 50 wt %, preferably 10 to 30 wt %, and very preferably 15 to 25 wt % of the dispersant,
iii) 30 to 80 wt % and preferably 45 to 65 wt % of the sulfonic acid compound, and
iv) 1 to 15 wt % and preferably 2 to 10 wt % of water.

It is particularly advantageous to use the additive of the invention in combination with cements having a relatively high soluble sulfates content (0.1 to 5 wt %, based on the cement). Cements of this kind are available commercially or can be admixed with the water-soluble sulfate salt. The cement is preferably rich in anhydrous aluminate phases. The water-soluble sulfate is preferably selected from sodium sulfate and/or potassium sulfate. The combination of the soluble sulfates and hardening accelerator of the invention results in a synergistic effect in accelerating the hardening of cement.

The additive of the invention may be admixed with hardening accelerators from the group of the alkanolamines, preferably triisopropanolamine and/or tetrahydroxyethylethylenediamine (THEED). The alkanolamines are preferably used in an addition of 0.01 to 2.5 wt %, based on the weight of the hydraulic binder, preferably cement. When amines are used, more particularly triisopropanolamine and tetrahydroxyethylethylenediamine, synergistic effects may be found with respect to the development of early strength in hydraulic binder systems, more particularly cementitious systems.

The additive of the invention may comprise solidification retardants from the group consisting of citric acid, tartaric acid, gluconic acid, phosphonic acid, aminotrimethylenephosphonic acid, ethylenediaminotetra(methylenephosphonic)acid, diethylenetriaminopenta(methylenephosphonic) acid, in each case including the respective salts of the acids, and pyrophosphates, pentaborates, metaborates and/or sugars (e.g., glucose, molasses). The advantage of adding solidification retardants is that the open time can be controlled, and in particular can optionally be extended. The solidification retardants are used preferably in an addition of 0.01 to 0.5 wt %, based on the weight of the hydraulic binder, preferably cement.

The additive of the invention may also comprise formulation components which are typically used within the field of construction chemicals, preferably defoamers, air entrainers, retardants, shrinkage reducers, redispersible powders, other hardening accelerators, frost preventatives and/or antiefflorescence agents.

An additive of the invention is firstly obtainable by A) reacting at least one water-soluble calcium salt of a nonpolymeric sulfonic acid with at least one water-soluble inorganic silicate compound in the presence of an aqueous solution of a dispersant. The calcium sulfonic acid salt of the nonpolymeric sulfonic acid in reaction A) serves as (a) reactant in the reaction (calcium source) in which the calcium silicate hydrate particles are formed. In accordance with the invention, after the reaction A), sulfonic salts and/or sulfonic acid anions are present in the additive.

An additive of the invention is secondly obtainable by B) reacting a water-soluble calcium compound (which is preferably not the calcium salt of a nonpolymeric sulfonic acid) with at least one water-soluble inorganic silicate compound in the presence of an aqueous solution of a dispersant, with addition of a water-soluble, nonpolymeric sulfonic salt. The sulfonic salt may be added before, during, and—preferably—after the reaction. It improves the drying properties of the C—S—H— suspension and allows the hardening-accelerating property of the additive of the invention to be maintained even through a subsequent drying step. It thus acts as a drying assistant.

In one preferred embodiment of the additive for hydraulically setting compositions, the molar ratio of the sulfonic acid compound present to silicon is in the range from 0.5 to 8, preferably 0.5 to 5, more particularly 1 to 5. If the additive is obtainable by reaction A), the ratio is preferably in the range from 1 to 4, more particularly 2 to 4. If the additive is obtainable by reaction A), the ratio is preferably in the range from 2.5 to 5.5.

The additive of the invention is preferably free of hydraulic binders, more particularly in cement-free form. "Free" or "cement-free" means that the additive contains in general less than 10 wt %, preferably less than 5 wt %, more particularly less than 1 wt %, and more preferably 0 wt % of hydraulic binder, more particularly cement.

The invention also relates to processes for preparing the above-described additive.

Process A) for preparing an additive of the invention is accomplished by reacting A) at least water-soluble calcium salt of a nonpolymeric sulfonic acid of the formula (1) ($K^{n+}$ is $H^+$) with at least one water-soluble inorganic silicate compound in the presence of an aqueous solution of a polymer dispersant. In this case it is preferable to use the sulfonic acid in the highest stoichiometric amount, i.e., no excess sulfonic acid is used. In accordance with the invention sulfonic salts and/or sulfonic acid anions of the formula (I) are present in the additive in the product of process A).

Process B) for preparing an additive of the invention is accomplished by reacting a water-soluble calcium compound (which is preferably not the calcium salt of a nonpolymeric sulfonic acid) with at least one water-soluble inorganic silicate compound in the presence of an aqueous solution of a dispersant, and adding a water-soluble, nonpolymeric sulfonic salt. The water-soluble sulfonic salt may be added before, during, and—preferably—after the reaction. In an optional drying step, which may take place following addition of the water-soluble sulfonic salt, the water-soluble sulfonic salt serves as a drying assistant.

As water-soluble calcium sulfonic acid salt, as water-soluble inorganic silicate compound, as water-soluble calcium compound, and as water-soluble sulfonic salt, compounds that are suitable include those compounds that only have a relatively poor solubility in water. It is nevertheless necessary to ensure that the reactivity is sufficient for the reaction in the aqueous environment with the corresponding reactant (either water-soluble calcium compound or water-soluble silicate compound). The solubility of the water-soluble calcium sulfonic acid salt, of the water-soluble inorganic silicate compound, of the water-soluble calcium compound, and of the water-soluble sulfonic salt is generally in each case greater than 0.01 g/l, preferably greater than 0.1 g/l, more preferably greater than 1 g/l, very preferably greater than 10 g/l, especially preferably greater than 50 g/l. The solubility is based on water as solvent at 20° C. and 1 bar (absolute).

In one preferred embodiment of process A), the water-soluble calcium sulfonic acid salt and the water-soluble inorganic silicate compound are each at least partially dissolved in water in separate vessels, and then reacted by addition of both solutions to the aqueous solution of the dispersant, the temperature being held at a constant 20° C. Alternatively the solutions of the water-soluble sulfonic salt of calcium and/or of the water-soluble silicate compound may first of all also be admixed with at least part of the aqueous solution of the dispersant. The dispersant, therefore, may be divided over at least two or three solutions. Advantageously 1% to 50% and preferably 10% to 25% of the total amount of the dispersant is present in the solution of the water-soluble sulfonic salt of calcium and/or in the solution of the water-soluble inorganic silicate compound.

In one preferred embodiment of process B), the water-soluble calcium compound and the water-soluble inorganic silicate compound are each at least partially dissolved in water in separate vessels, and then reacted by addition of both solutions to the aqueous solution of the dispersant, the temperature being held at a constant 20° C. Alternatively the solutions of the water-soluble calcium compound and/or of the water-soluble silicate compound may first of all also be admixed with at least part of the aqueous solution of the dispersant. The dispersant, therefore, may be divided over at least two or three solutions. Advantageously 1% to 50% and preferably 10% to 25% of the total amount of the dispersant is present in the solution of the water-soluble calcium compound and/or in the solution of the water-soluble inorganic silicate compound.

Besides water, the aqueous solution of the dispersant may also comprise one or more other solvents (examples being alcohols such as ethanol and/or isopropanol). The weight fraction of the nonwater solvent, relative to the sum of all the solvents, is preferably up to 20 wt %, more preferably less than 10 wt %, and very preferably less than 5 wt %. Very particularly preferred, however, are aqueous systems without any solvent. The temperature range in which the process is carried out is not subject to any particular restrictions. Certain limits are imposed, however, by the physical state of the system. It is preferred to operate in the range from 0 to 100° C., more preferably from 5 to 80° C., and very preferably from 15 to 35° C.

The process can also be carried out under various pressures, preferably in the range from 1 to 5 bar.

The pH is dependent on the quantity and nature of the reactants and on the quantity and nature of the dispersant. The pH at the end of the synthesis is preferably higher than 8 and more preferably in the range between 8 and 13.5. Alternatively the pH can be adjusted by addition of acid or base.

In one preferred embodiment of process A), the addition of the water-soluble sulfonic salt of calcium and of the water-soluble inorganic silicate compound to the aqueous solution of the dispersant takes place in a cyclical semibatch process with first and second reactors arranged in series. In this case the aqueous solution of the dispersant is charged to the second reactor. The first reactor is charged with the solution of the water-soluble inorganic silicate compound, with the solution of the water-soluble sulfonic salt of calcium, and with the contents of the second reactor, and the outflow from the first reactor is passed into the second reactor.

In another preferred embodiment of the processes, the addition is made as part of a continuous process, in which the water-soluble calcium sulfonic acid salt, the water-soluble inorganic silicate compound, and the aqueous solution of the dispersant are mixed in the first reactor and the outflow from the first reactor is introduced into a second reactor (mixed flow reactor or plug flow reactor).

The ratio of the volumes of the first and second reactors is preferably 1/10 to 1/20 000. The mass flow rate of the water-soluble sulfonic salt of calcium and of the water-soluble inorganic silicate compound in comparison to the mass flow emerging from the second reactor and entering the first reactor is preferably small; the ratio is preferably 1/5 to 1/1000. The first reactor may, generally speaking, be a static or dynamic mixing unit; mixing ought preferably to be effective in the first reactor.

The combining and mixing of the components in accordance with processes A) and B) take place preferably with use of a dispersing means which is capable of introducing mechanical energy into the mixture, more particularly by grinding, in order to activate and/or accelerate the conversion of the reaction components and in order, if desired, to reduce the size of the C—S—H— particles. Suitable dispersing means are those which exert high shearing forces on the reaction mixture. Examples of suitable dispersing means are planetary ball mills, ultradispersing apparatus, rotor-stator dispersing apparatus, and shaker apparatus with grinding media. Such means are available commercially—for example, Dispermat from VMA Getzmann GmbH, Disperser DAS H 200 from Lau GmbH, or Magic Lab from Ika-Werke GmbH.

The additive of the invention is added to the hydraulically setting compositions preferably in an amount of 0.01 to 10 wt % and very preferably 0.1 to 2 wt % of the solids content, based on the hydraulic binder, preferably cement. The solids content is determined in an oven at 60° C., until a constant sample weight has been attained.

The water-soluble calcium compound of process B) is generally selected from calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium oxide, calcium hypochlorite, calcium iodate, calcium iodide, calcium lactate, calcium nitrite, calcium oxalate, calcium phosphate, calcium propionate, calcium silicate, calcium stearate, calcium sulfate, calcium sulfate hemihydrate, calcium sulfate dihydrate, calcium sulfide, calcium tartrate, calcium aluminate, tricalcium silicates, dicalcium silicate, and mixtures of two or more of these components. Preferably the water-soluble calcium compound is not a calcium silicate. The silicates—calcium silicate, dicalcium silicate and/or tricalcium silicate—are less preferred on account of reduced solubility (particularly in the case of calcium silicate) and on economic grounds (price) (more particularly in the case of dicalcium silicate and tricalcium silicate).

The water-soluble calcium compound of process B) is preferably selected from calcium citrate, calcium tartrate, calcium formate and/or calcium sulfate. The advantage of these calcium compounds lies in their noncorrosiveness. Calcium citrate and/or calcium tartrate, owing to the possible retarding effect of these anions when used at high concentrations, are employed preferably in combination with other calcium sources.

In a further embodiment, the water-soluble calcium compound of process B) is selected from calcium chloride and/or calcium nitrate. The advantage of these calcium compounds lies in their ready water-solubility, their low price, and their ready availability.

The water-soluble inorganic silicate compound is generally in the form of sodium silicate, potassium silicate, waterglass, aluminum silicate, silicic acid, sodium metasilicate and/or potassium metasilicate.

The water-soluble inorganic silicate compound is preferably in the form of sodium metasilicate, potassium metasilicate and/or waterglass. The advantage of these silicate compounds lies in their extremely good water solubility.

With particular preference the water-soluble inorganic silicate compound is selected from an alkali metal silicate of the formula $m\,SiO_2.n\,M_2O$ or mixtures thereof, where M is Li, Na, K, and $NH_4$, preferably Na or K, m and n are molar numbers, and the ratio of m:n is about 0.9 to about 4, preferably about 0.9 to about 3.8, and more particularly about 0.9 to about 3.6.

The invention also relates to a process for preparing the additive for hydraulically setting compositions by reacting a calcium compound, preferably a calcium salt, very preferably a water-soluble calcium salt, with a silicon dioxide-containing component under alkaline conditions, the reaction being carried out in the presence of an aqueous solution of the dispersant, and a water-soluble sulfonic salt being added.

The calcium compound preferably comprises calcium salts (e.g., calcium salts of carboxylic acids). The calcium salt may be, for example, calcium chloride, calcium nitrate, calcium formate, calcium acetate, calcium hydrogencarbonate, calcium bromide, calcium carbonate, calcium citrate, calcium chlorate, calcium fluoride, calcium gluconate, calcium hydroxide, calcium oxide, calcium hypochlorite, calcium iodate, calcium iodide, calcium lactate, calcium nitrite, calcium oxalate, calcium phosphate, calcium propionate, calcium silicate, calcium stearate, calcium sulfate, calcium sulfate hemihydrate, calcium sulfate dihydrate, calcium sulfide, calcium tartrate, calcium aluminate, tricalcium silicate and/or dicalcium silicate. Calcium hydroxide and/or calcium oxide are preferred on account of their strong alkaline properties. The water-soluble calcium compound is preferably not a calcium silicate. The silicates—calcium silicate, dicalcium silicate and/or tricalcium silicate—are less preferred on account of low solubility (especially in the case of calcium silicate) and on economic grounds (price) (more particularly in the case of dicalcium silicate and tricalcium silicate). Also less preferred are calcium salts that are not so readily soluble, such as calcium carbonate, for example, and also calcium salts with anions that have a retardant effect (for example, citrate, gluconate, and tartrate may retard the hardening of hydraulic binders). In the case of neutral or acidic calcium salts (e.g., calcium chloride or calcium nitrate), preference is given to using a suitable base for adjusting the pH to alkaline conditions (e.g., lithium hydroxide, sodium hydroxide, potassium hydroxide, ammonia, magnesium hydroxide, or another alkaline earth metal hydroxide). Preference is given to a pH of more than 8, more preferably more than 9, and very preferably more than 11. The pH is measured preferably at 25° C. at a suspension solids content of 1 wt %.

It is possible for any desired material comprising silicon dioxide to be used as silicon dioxide-containing component—examples are microsilica, pyrogenic silica, precipitated silica, blast furnace slag and/or silica sand. Small particle sizes of the silicon dioxide-containing material are preferred, more particularly particle sizes below 1 µm. It is possible, furthermore, to use compounds which are able to react to give silicon dioxide in an aqueous alkaline environment, such as, for example, tetraalkoxysilicate compounds of the general formula $Si(OR)_4$. R may be identical or different and may be selected, for example, from a branched or unbranched $C_1$- to $C_{10}$ alkyl group. Preferably R is methyl, more preferably ethyl.

In one preferred embodiment the silicon dioxide-containing compound is selected from the group consisting of microsilica, pyrogenic silica, precipitated silica, blast furnace slag and/or silica sand. Preference is given to microsilica, pyrogenic silica and/or precipitated silica, more particularly precipitated and/or pyrogenic silica. The types of silica listed above are defined in Ullmann's Encyclopedia of Industrial Chemistry, Wiley-VCH, Release 2009, 7th edition, DOI 10.1002/14356007.a23_583.pub3.

It is preferred to apply mechanical energy to the reaction mixture, preferably by grinding, in order to activate and/or accelerate the reaction of the calcium salt with the typically less water-soluble silicon dioxide-containing component. The mechanical energy is also advantageous for achieving the desired small particle sizes of the calcium silicate hydrates. The word "grinding" in the present patent specification denotes any method in which high shearing forces are exerted on the reaction mixture in order to accelerate the reaction and to obtain an appropriate particle size. Grinding may be carried out, for example, in an agitated ball mill in continuous or discontinuous operation mode. Alternatively to this an ultradisperser may be used, preferably with a rotary speed of more than 5000 rpm. A further possibility is to use a shaker device in which small grinding media, preferably having a diameter of less than 1 mm, are combined with the reaction mixture in a container, and shaken. The shaker device is obtainable, for example, from the company Fast & Fluid.

The alkaline conditions mean a process pH of typically greater than 9.

The molar ratio of calcium from the calcium compound to silicon from the silicon dioxide-containing component is preferably 0.6 to 2, preferably 1.0 to 1.5.

The weight ratio of water to the sum of calcium compound and silicon dioxide-containing component is typically 0.2 to 50, preferably 2 to 10 and very preferably 4 to 6. Water in this context means the water in the reaction mixture in which the process is carried out. The process is preferably carried out at relatively low water contents, in order to raise the production rate of the process. This also facilitates drying. A ratio of 2 to 10 or 4 to 6 is particularly preferred since a pastelike product consistency can be obtained, which is preferred for the grinding process.

In a further embodiment of the invention, the reaction is carried out at least partly in the presence of an aqueous solution which comprises a viscosity enhancer polymer from the group of the polysaccharide derivatives and/or (co) polymers having an average molecular weight Mw of more than 500 000 g/mol, more preferably more than 1 000 000 g/mol, the (co)polymers comprising structural units derived (preferably by radical polymerization) from nonionic (meth) acrylamide monomer derivatives and/or sulfonic acid monomer derivatives. The additives of the invention thus optionally comprise such viscosity enhancer polymers. The viscosity enhancer polymer may be added at the start, during the process, or at the end of the process. Thus it may be added, for example, to the aqueous solution of the comb polymer, to the calcium compound and/or to the silicate compound. The viscosity enhancer polymer may also be used, during the process of preparing a hardening accelerator composition by reaction of a calcium compound, preferably a calcium salt, very preferably a water-soluble calcium salt, with a silicon dioxide-containing component. The viscosity enhancer polymer is preferably added after the end of the reaction (after the end of the addition of the reactants), in order to prevent destabilization of particles and to retain the optimum stability. The viscosity enhancer agent thus has a stabilizing function, insofar as segregation (aggregation and sedimentation) of calcium silicate hydrate, for example, can be prevented. The viscosity enhancer agents are employed preferably in an addition of 0.001 to 10 wt % and more preferably 0.001 to 1 wt %, based on the weight of the hardening accelerator suspension. The viscosity enhancer polymer ought preferably to be metered such as to produce hardening accelerator suspensions having a plastic viscosity of more than 80 mPa·s.

Preferred polysaccharide derivatives are cellulose ethers, examples being alkylcelluloses such as methylcellulose, ethylcellulose, propylcellulose, and methylethylcellulose, hydroxyalkylcelluloses such as hydroxyethylcellulose (HEC), hydroxypropylcellulose (HPC), and hydroxyethylhydroxypropylcellulose, alkylhydroxyalkylcelluloses such as methylhydroxyethylcellulose (MHEC), methylhydroxypropylcellulose (MHPC), and propylhydroxypropylcellulose. Preferred cellulose ether derivatives are methylcellulose (MC), hydroxypropylcellulose (HPC), hydroxyethylcellulose (HEC), and ethylhydroxyethylcellulose (EHEC), and particularly preferred are methylhydroxyethylcelluose (MHEC), and methylhydroxypropylcellulose (MHPC). The above cellulose ether derivatives, obtainable in each case by corresponding alkylation and alkoxylation of cellulose, are preferably in the form of nonionic structures, though it would also be possible to use carboxymethylcellulose (CMC), for example. Preference, moreover, is given to the use of nonionic starch ether derivatives such as hydroxypropyl starch, hydroxyethyl starch, and methylhydroxypropyl starch. Hydroxypropyl starch is preferred. Also preferred are microbially prepared polysaccharides such as welan gum and/or xanthans and naturally occurring polysaccharides such as alginates, carrageenans, and galactomannans. They can be obtained by extractive methods from corresponding natural products, such as from algae in the case of alginates and carrageenans and from carob seeds in the case of galactomannans.

The viscosity enhancer (co)polymers with a weight-average molecular weight MW of more than 500 000 g/mol, more preferably more than 1 000 000 g/mol, may be prepared (preferably by radical polymerization) from nonionic (meth)acrylamide monomer derivatives and/or sulfonic acid monomer derivatives. The respective monomers may be selected, for example, from the group consisting of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide, and/or sulfonic acid monomer derivatives from the group consisting of styrene sulfonic acid, 2-acrylamido-2-methylpropanesulfonic acid, 2-methacrylamido-2-methylpropanesulfonic acid, 2-acrylamidobutanesulfonic acid and/or 2-acrylamido-2,4,4-trimethylpentanesulfonic acid, or the salts of the stated acids. The viscosity enhancer agent comprises preferably more than 50 mol % and more preferably more than 70 mol % of structural units deriving from nonionic (meth)acrylamide monomer derivatives and/or sulfonic acid monomer derivatives. Other structural units present preferably in the copolymers may be derived, for example, from the monomers (meth)acrylic acid, esters of (meth)acrylic acids with branched or unbranched $C_1$- to $C_{10}$ alcohols, vinyl acetate, vinyl propionate and/or styrene.

In a further embodiment of the invention, the viscosity enhancer polymer is a polysaccharide derivative from the group consisting of methylcellulose, hydroxyethylcellulose (HEC), hydroxypropylcellulose (HPC), methylhydroxyethylcellulose (MHEC), methylhydroxypropylcellulose (MHPC) and/or (co)polymers having a weight-average molecular weight Mw of more than 500 000 g/mol, more preferably more than 1 000 000 g/mol, the (co)polymers comprising structural units deriving (preferably by radical polymerization) from nonionic (meth)acrylamide monomer derivatives from the group consisting of acrylamide, preferably acrylamide, methacrylamide, N-methylacrylamide, N-methylmethacrylamide, N,N-dimethylacrylamide, N-ethylacrylamide, N,N-diethylacrylamide, N-cyclohexylacrylamide, N-benzylacrylamide, N,N-dimethylaminopropylacrylamide, N,N-dimethylaminoethylacrylamide and/or N-tert-butylacrylamide and/or sulfonic acid monomer derivatives from the group consisting of 2-acrylamido-2-methylpropanesulfonic acid, 2-methacrylamido-2-methylpropanesulfonic acid, 2-acrylamidobutanesulfonic acid and/or 2-acrylamido-2,4,4-trimethylpentanesulfonic acid or the salts of the stated acids.

Within the group of the nonionic (meth)acrylamide monomer derivatives, preference is given to methylacrylamide, N,N-dimethylacrylamide and/or methacrylamide, and particular preference to acrylamide. Within the group of the sulfonic acid monomers, 2-acrylamido-2-methylpropanesulfonic acid (AMPS) and its salts are preferred. The viscosity enhancer polymers may be added at the beginning of the process or at any other point in time.

The process of the invention is preferably carried out at the site of concrete production (for example, a ready-mix concrete plant or precast concrete plant, or another plant in which mortar, concrete, or other cement products are produced), the resulting additive being suitable for use as batching water or as part of the batching water.

Batching water in this context is the water which is used in concrete production or in the production of similar cementitious materials. Typically the batching water is mixed with cement and, for example, aggregates in a ready-mix concrete plant or precast concrete plant, on a building site or at another location at which concrete or other cementitious materials are produced. The batching water may, generally speaking, include a broad range of additives, such as, for example, plasticizers, hardening accelerators, retarders, shrinkage reducers, air entrainers and/or defoamers.

A high level of dilution of the suspension is advantageous for the efficacy of the additive of the invention.

A preferred variant of process A) of the invention, therefore, carried out preferably at the site of concrete production (for example, a ready-mix concrete plant or precast concrete plant), is that wherein the weight ratio of the sum of the water-soluble sulfonic salt of calcium, of the water-soluble inorganic silicate compound, and of the dispersant, to water, preferably to batching water, is between 1/1000 and 1/10 and more preferably between 1/500 and 1/100.

A preferred variant of process B) of the invention, therefore, carried out preferably at the site of concrete production (for example, a ready-mix concrete plant or precast concrete plant), is that wherein the weight ratio of the sum of the water-soluble calcium compound, of the water-soluble inorganic silicate compound, of the dispersant, and of the water-soluble sulfonic salt, to water, preferably to batching water, is between 1/1000 and 1/10 and more preferably between 1/500 and 1/100.

In a further embodiment of the process, the additive is prepared at least partly in the presence of an aqueous solution which comprises hardening accelerators from the group of the alkanolamines, preferably triisopropanolamine and/or tetrahydroxyethylethylenediamine (THEED). The alkanolamines are used preferably in an addition of 0.01 to 2.5 wt %, based on the weight of the hydraulic binder, preferably cement. If amines are used, more particularly triisopropanolamine and tetrahydroxyethylethylenediamine, they might produce synergistic effects in relation to the development of early strength in hydraulic binder systems, especially cementitious systems. The amine is preferably added after the end of the reaction.

In a preferred process variant, the additive for hydraulically setting compositions is dried, preferably by spray drying. The drying method is not subjected to any particular restrictions. Drying may also take place in a fluid-bed dryer. It is common knowledge that water, even in small amounts, is detrimental to numerous binders, especially cement, owing to unwanted premature hydration processes. Powder products, with their typically very low water content, are advantageous in comparison to aqueous systems, since they can be mixed into cement and/or other binders such as gypsum, calcium sulfate hemihydrate (bassanite), anhydrous calcium sulfate, slags, preferably comminuted granulated blast furnace slag, flyash, finely ground silica, metakaolin, natural pozzolans, calcined oil shale, calcium sulfoaluminate cement and/or calcium aluminate cement.

The invention also relates to additives obtainable by the processes of the invention.

The invention embraces the use of the additive of the invention in building material mixtures, comprising cement, gypsum, anhydrite, slag, preferably comminuted granulated blast furnace slag, flyash, finely ground silica, metakaolin, natural pozzolans, calcined oil shale, calcium sulfoaluminate cement and/or calcium aluminate cement, preferably in building material mixtures comprising predominantly cement as hydraulic binder. Gypsum in this context encompasses all possible calcium sulfate sources with various amounts of water of crystallization molecules, including—for example—calcium sulfate hemihydrate.

The additives of the invention surprisingly bring about increased early strength, more particularly after six hours. As a result of the increased development of early strength, early deshuttering of concrete bodies is enabled in the ready-mix concrete sector and in the precast concrete sector, thereby permitting shorter production cycles.

The present invention also relates to the use of the additives of the invention as grinding assistants in the production of (portland) cement, slag, flyash, lime, pozzolans, or a mixture thereof, used preferably for (portland) cement.

The present invention further relates to the use of the additives of the invention in mineral-oil and natural-gas wells, more particularly in the development, exploitation, and completion of underground mineral-oil and natural-gas deposits, and also in deep wells. The additives here serve as setting accelerators for inorganic binders, more particularly for accelerating the setting of the cement slurries in the borehole cementing of mineral-oil and natural-gas wells.

Suitable inorganic binders whose setting is accelerated in accordance with the invention are preferably portland cements, calcium aluminate cements, gypsum, anhydrite, blast furnace slag, slag sands, flyashes, silica dust, metakaolin, natural and synthetic pozzolans and/or calcined oil shales, preferably portland cements.

The setting accelerator composition is used in accordance with the invention advantageously together with other additives customary in borehole cementing, more particularly plasticizers, water retention agents and/or rheology modifier additives.

The invention also relates to building material mixtures which comprise a composition, preferably an aqueous hardening accelerator suspension, in accordance with the present invention and cement, gypsum, anhydrite, slag, preferably comminuted granulated blast furnace slag, flyash, finely ground silica, metakaolin, natural pozzolans, calcined oil shale, calcium sulfoaluminate cement and/or calcium aluminate cement. The building material mixtures preferably comprise predominantly cement as hydraulic binder. The hardening accelerator composition is present in the building material mixture preferably in an addition of 0.05 wt % to 5 wt %, based on the clinker weight.

For illustration, the term "building material mixtures" can mean mixtures in dry or aqueous form and in a hardened or plastic state. Dry building material mixtures may be, for example, mixtures of the stated binders, preferably cement, and the hardening accelerator compositions of the invention (preferably in powder form). Mixtures in aqueous form, generally in the form of suspensions, pastes, fresh mortar or fresh concrete, are produced by adding water to the binder component or components and the hardening accelerator composition; they then pass from the plastic to the hardened state.

The invention is illustrated in more detail by the appended figure and by the examples which follow.

Figure 1 shows the heat flow of setting cement (A) when using the hardening accelerator suspension H1 (addition of 0.6 wt % of the suspension, solids relative to the mass of cement) and H2 (addition of 0.6 wt % of the suspension, solids relative to the mass of cement). t—time in h, HF—specific heat flow in $mW/g_{cement}$ Polymers used for preparing the hardening accelerator suspensions are as follows:

Polymer 1

Polymer 1 is a comb polymer and is based on the monomers maleic acid, acrylic acid, and vinyloxybutylpolyethylene glycol—5800. The molar ratio of acrylic acid to maleic acid is 7. Mw=40 000 g/mol and was determined via GPC. The solids content is 45 wt %. The synthesis is described for example in EP0894811. The charge density is 930 μeq/g.

Polymer 2

The comb polymer 2 is a condensate formed from the building blocks phenol PEG5000 and phenoxyethanol phosphate. The molecular weight is 23 000 g/mol. The synthesis is described in DE102004050395. The solids content is 31%. The charge density is 745 μeq/g.

Polymer 3

Polymer 3 is a comb polymer and is based on the monomers acrylic acid and vinyloxybutylpolyethylene glycol—3000. Mw=23 000 g/mol and was determined by GPC. The solids content is 52 wt %. The charge density is 1410 μeq/g.

Examples for the use of sulfonic salts as drying assistants:

EXAMPLE 1

Preparation of the Hardening Accelerator Suspension H1 (Not Inventive)

A calcium source was prepared by weighing out 600 g of $Ca(OH)_2$ (purity 92%) and 488 g of $Ca(CH_3COO^-)_2$ (purity 100%) into 4.328 kg of $H_2O$. A silicate source was prepared by weighing out 2.28 kg of sodium waterglass (solids content=36.1 wt %) with an $SiO_2/Na_2O$ molar ratio of 3.4 into 1.15 kg of $H_2O$. A dispersant solution was prepared by weighing out 2.268 kg of polymer 3 (35 wt % strength polymer solution) and 0.523 kg of polymer 2 (35 wt % strength polymer solution) into 8.36 kg of $H_2O$. The dispersant solution was introduced initially and was pumped in circulation through a high-energy mixer equipped with rotor/stator system. In the high-energy mixer, the calcium source, which is stirred to prevent sedimentation, and the silicate source are metered completely into the initially introduced solution over the course of 80 minutes, with the rotor/stator system at a rotational speed of 8000 rpm. During this procedure, the initial charge introduced is maintained at 20° C.

The solids content of H1 is 14.7 wt %, as determined by drying to constant weight in a forced-air drying cabinet at 60° C.

Influence of the Hardening Accelerator Suspensions on Hardening (Not Inventive)

The effect of the hardening accelerator suspensions H1 on hardening was tested on the cement (CEM I Milke 52.5 R) by measurement of the release of heat, using heat flow calorimetry (figure 1). The hardening accelerator suspension was mixed with the batching water, and the resulting suspension was mixed with 20 g of the cement. The water-to-cement ratio (w/c) was set at 0.32. The level at which the accelerator under test was added was 0.6 wt % of solids content of H1, based on the cement weight. The heat flow curves are shown in figure 1. The addition of the hardening accelerator suspension accelerates the hardening (defined in H. F. W. Taylor (1997): Cement Chemistry, 2nd edition, p. 212ff). The effect is summarized in table 1.

The reference represents the heat flow of CEM I Milke 52.5 R without addition of an accelerator; curve 2 shows the heat flow for CEM I Milke 52.5 R are with addition of 0.6 wt % of the hardening accelerator suspension H1.

TABLE 1

Heat flow in the main hydration period

| Sample | Cumulative heat of hydration after 6 h (J/g) | Acceleration relative to reference (%) |
|---|---|---|
| CEM I Milke 52.5 R without accelerator | 40.7 | — |
| with 0.6 wt % of suspension H1 | 96.0 | 236 |

EXAMPLE 2

Production of Dried Hardening Accelerators

Hardening accelerator suspension H1 was admixed with drying assistants and dried. Drying took place by spray drying, with the drying assistant having been mixed with the hardening accelerator suspension H1 prior to the drying operation for around 5 minutes. The amounts of the hardening accelerator suspension H1 weighed out for the spray drying, and the amounts of the respective drying assistants used, are shown in table 2. For the comparative examples TH1-e to TH1-h, calcium chloride is used as the drying assistant, which is disadvantageous owing to the risk of corrosion.

TABLE 2

Production of dried hardening accelerators (TH1-a to TH1-h are noninventive comparative examples)

| Powder | Initial mass of H1 [g] | Drying assistant | Initial mass of additive [g] | Dryer temp. exit [° C.] |
|---|---|---|---|---|
| TH1-a | 500 | — | — | 60 |
| TH1-b | 500 | — | — | 80 |
| TH1-c | 500 | — | — | 100 |
| TH1-d | 500 | — | — | 120 |
| TH1-e | 500 | $CaCl_2$ | 10.8 | 60 |
| TH1-f | 500 | $CaCl_2$ | 10.8 | 80 |
| TH1-g | 500 | $CaCl_2$ | 10.8 | 100 |
| TH1-h | 500 | $CaCl_2$ | 10.8 | 120 |
| TH1-m | 542.6 | $NaSO_3CH_3$ | 38.0 | 80 |
| TH1-n | 654.0 | $Ca(SO_3CH_3)_2$ | 45.8 | 80 |
| TH1-o | 620.8 | $NaSO_3NH_2$ | 43.5 | 80 |
| TH1-p | 609.8 | $Ca(SO_3NH_2)_2$ | 42.7 | 80 |
| TH1-q | 631.8 | $Ca(SO_3NH_2)_2$ | 33.2 | 80 |
| TH1-r | 567.0 | $Ca(SO_3NH_2)_2$ | 59.5 | 80 |
| TH1-s | 670.0 | $Ca(SO_3NH_2)_2$ | 46.9 | 100 |
| TH1-t | 615.4 | $Ca(SO_3NH_2)_2$ | 43.1 | 110 |

EXAMPLE 3

Effect of Dried Hardening Accelerators on Hardening

The effect of the hardening accelerators obtained by drying on the hardening was tested on the cement (CEM I Milke 52.5 R) by measurement of the release of heat, using heat flow calorimetry. The hardening accelerator was mixed with the batching water, and the suspension obtained was then mixed with 20 g of the cement. The water-to-cement ratio (w/c) was set at 0.32. The level at which the accelerators under test were metered in table 3 was selected so as to use in each case the same amount of the solid of H1, i.e., 0.6 wt %, based on the cement. Depending on the addition of the drying assistant of the invention, the absolute amount of the accelerator of the invention that is used will vary, with the amount of the solids of H1, based on the cement, as described above, being kept constant. The addition of the additive of the invention accelerates the hardening (defined in H. F. W. Taylor (1997): Cement Chemistry, 2nd edition, p. 212ff). The acceleration factors are summarized in table 3.

TABLE 3

Dried hardening accelerators, heat flow in the main hydration period (TH1-a to TH1-h are noninventive comparative examples)

| Sample | Cumulative heat of hydration after 6 h (J/g) | Acceleration relative to reference (%) |
|---|---|---|
| CEM I Milke 52.5 R + 0.6 wt % TH 1-a | 53.7 | 132 |
| CEM I Milke 52.5 R + 0.6 wt % TH1-b | 60.2 | 148 |
| CEM I Milke 52.5 R + 0.6 wt % TH1-c | 58.6 | 144 |
| CEM I Milke 52.5 R + 0.6 wt % TH1-d | 56.2 | 138 |
| CEM I Milke 52.5 R + 0.7 wt % TH1-e | 86.2 | 212 |
| CEM I Milke 52.5 R + 0.7 wt % TH1-f | 88.3 | 217 |
| CEM I Milke 52.5 R + 0.7 wt % TH1-g | 86.3 | 212 |
| CEM I Milke 52.5 R + 0.7 wt % TH1-h | 82.6 | 203 |
| CEM I Milke 52.5 R + 0.93 wt % TH1-m | 75.0 | 184 |
| CEM I Milke 52.5 R + 0.93 wt % TH1-n | 81.6 | 200 |
| CEM I Milke 52.5 R + 0.93 wt % TH1-o | 81.0 | 200 |
| CEM I Milke 52.5 R + 0.93 wt % TH1-p | 88.1 | 217 |
| CEM I Milke 52.5 R + 0.84 wt % TH1-q | 81.8 | 201 |
| CEM I Milke 52.5 R + 1.07 wt % TH1-r | 87.2 | 214 |
| CEM I Milke 52.5 R + 0.93 wt % TH1-s | 79.9 | 196 |
| CEM I Milke 52.5 R + 0.93 wt % TH1-t | 83.8 | 206 |

Examples for the Use of Water-Soluble Sulfonic Salts of Calcium for Producing Calcium Silicate Hydrate Particles

EXAMPLE 4 (INVENTIVE)

Preparation of the Hardening Accelerator Suspension H2

A calcium source was prepared by dissolving 122 g of amidosulfuric acid (purity 100%) in 288.7 g of $H_2O$, followed by slow addition of 46.7 g of $Ca(OH)_2$ (purity 95%). A silicate source was prepared by dissolving 104.9 g of sodium metasilicate pentahydrate (purity 99%) in 109.7 g of $H_2O$. A dispersant solution was prepared by weighing out 82.8 g of a solution of polymer 1 (45 wt % strength polymer solution) and 245.1 g of $H_2O$. The dispersant solution was introduced initially and pumped in circulation through a high-energy mixer with a mixing volume of 20 ml and equipped with a rotor/stator system. In the high-energy mixer, the calcium source and the silicate source are metered completely into the initially introduced solution over the course of 80 minutes, with the rotor/stator system operating at a rotational speed of 8000 rpm. During this procedure, the initially introduced solution is maintained at 20° C.

Preparation of the Hardening Accelerator Suspension H3 (Inventive)

A calcium source was prepared by dissolving 173.3 g of methanesulfonic acid (purity 100%) in 236.7 g of $H_2O$, followed by slow addition of 46.7 g of $Ca(OH)_2$ (purity 95%). A silicate source was prepared by dissolving 104.9 g of sodium metasilicate pentahydrate (purity 99%) in 109.7 g of $H_2O$. A dispersant solution was prepared by weighing out 101.9 g of a solution of polymer 1 (45 wt % strength polymer solution), 26.3 g of a solution of polymer 2 (35 wt % strength polymer solution), and 200.3 g of water. The dispersant solution was introduced initially and pumped in circulation through a high-energy mixer with a mixing volume of 20 ml and equipped with a rotor/stator system. In the high-energy mixer, the calcium source and the silicate source are metered completely into the initially introduced solution over the course of 80 minutes, with the rotor/stator system operating at a rotational speed of 8000 rpm. During this procedure, the initially introduced solution is maintained at a temperature of 20° C.

Drying of the Hardening Accelerator Suspensions H2 and H3 (Inventive)

The hardening accelerator suspensions H2 and H3 were dried by spray drying at an exit temperature of 80° C. without addition of a drying assistant. This produced, from suspension H2, the dried hardening accelerator T2, and similarly, from H3, the dried hardening accelerator T3.

Influence of the Hardening Accelerator Suspensions H2 and H3 and of the Dried Hardening Accelerators T2 and T3 on the Hardening of Cementitious Systems The hardening effect of the hardening accelerators T2 and T3, obtained on drying, was tested on the cement (CEM I Milke 52.5 R) by measurement of the release of heat, using heat flow calorimetry. The hardening accelerator was mixed with the batching water, and the resulting suspension was mixed with 20 g of the cement. The water-to-cement ratio (w/c) was set at 0.32. The metering of the accelerators under test was selected such that in each case the same amount of the solids of H2 and H3 was used, i.e., 0.6 wt % based on the cement. The addition of the additive of the invention accelerates the hardening (defined in H. F. W. Taylor (1997): Cement Chemistry, 2nd edition, p. 212ff). The effect is summarized in table 4.

TABLE 4

Hardening accelerators H2 and H3 and also dried hardening accelerators T2 and T3; comparison of heats of hydration after 6 h

| Powder | Cumulative heat of hydration after 6 h (J/g) | Acceleration relative to reference (%) |
|---|---|---|
| CEM I Milke 52.5 R (reference) | 36.6 | — |
| CEM I Milke 52.5 R + 0.6 wt % H2 | 93.5 | 255 |
| CEM I Milke 52.5 R + 0.6 wt % T2 | 80.8 | 221 |
| CEM I Milke 52.5 R + 0.6 wt % H3 | 90.2 | 246 |
| CEM I Milke 52.5 R + 0.6 wt % T3 | 85.2 | 233 |

The invention claimed is:

1. An additive for hydraulically setting compositions, comprising
a) at least one polymeric dispersant comprising structural units having anionic or anionogenic groups and structural units having polyether side chains,
b) at least one sulfonic acid compound of the formula (I)

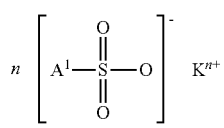

(I)

in which
$A^1$ is $NH_2$, NHMe, $NMe_2$, $N(CH_2-CH_2-OH)_2$, $CH_3$, $C_2H_5$, $CH_2-CH_2-OH$, phenyl, or p-$CH_3$-phenyl, and
$K^{n+}$ is an alkali metal cation, or a cation selected from $Ca^{2+}$, $Mg^{2+}$, $Sr^{2+}$, $Ba^{2+}$, $Zn^{2+}$, $Fe^{2+}$, $Fe^{3+}$, $Al^{3+}$, $Mn^{2+}$, or $Cu^{2+}$, and
n is the value of the cation; and
c) calcium silicate hydrate particles.

2. The additive as claimed in claim 1, wherein $A^1$ is $NH_2$ or $CH_3$.

3. The additive as claimed in claim 1, wherein $K^{n+}$ is $Na^+$, $K^+$, or $Ca^{2+}$.

4. The additive as claimed in claim 1, prepared by reacting a calcium salt of at least one sulfonic acid compound of the formula (I) with at least one water-soluble inorganic silicate compound in the presence of an aqueous solution of the dispersant.

5. The additive as claimed in claim 1, in the form of a suspension or in solid form, more particularly as powder.

6. The additive as claimed in claim 1, having in powder form a water content of less than 10 wt %.

7. The additive as claimed in claim 1, wherein the molar ratio of calcium to silicon in the calcium silicate hydrate particles is 0.6 to 2.

8. The additive as claimed in claim 1, wherein the dispersant comprises at least one polymer obtained by polymerizing at least one monomer having at least one anionic or anion genic group and at least one monomer comprising at least one polyether side chain.

9. The additive as claimed in claim 8, wherein the polymer as polyether side chain has at least one structural unit of the general formulae (IIa), (IIb), (IIc) and/or (IId):

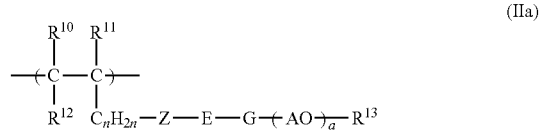

(IIa)

wherein
$R^{10}$, $R^{11}$, and $R^{12}$ independently of one another are H or an unbranched or branched $C_1$-$C_4$ alkyl group;
Z is O or S;
E is an unbranched or branched $C_1$-$C_6$ alkaline group, a cyclohexene group, $CH_2$-$C_6H_{10}$, 1,2-phenylene, 1,3-phenylene, or 1,4-phenylene;
G is O, NH, or CO—NH; or
E and G together are a chemical bond;
A is $C_xH_{2x}$ wherein x is 2, 3, 4, or 5, or $CH_2CH(C_6H_5)$;
n is 0, 1, 2, 3, 4, and/or 5;
a is an integer from 2 to 350;
$R^{13}$ is H, an unbranched or branched $C_1$-$C_4$ alkyl group, CO—$NH_2$ and/or $COCH_3$;

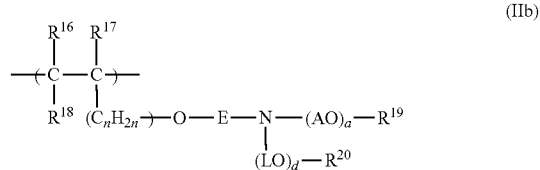

(IIb)

wherein
$R^{16}$, $R^{17}$, and $R^{18}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene, or 1,4-phenylene, or a chemical bond;
A is $C_xH_{2x}$ wherein x is 2, 3, 4, or 5, or $CH_2CH(C_6H_5)$;
L is $C_xH_{2x}$ wherein x is 2, 3, 4, or 5, or $CH_2$—$CH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched or branched $C_1$-$C_4$ alkyl group; and
n is 0, 1, 2, 3, 4, or 5;

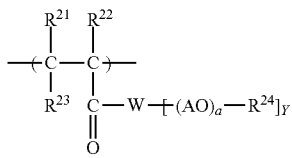
(IIc)

in which
$R^{21}$, $R^{22}$ and $R^{23}$ independently of one another are H or an unbranched or branched $C_1$-$C_4$ alkyl group;
W is O, $NR^{25}$, or N;
Y is 1 if W=O or $NR^{25}$, and is 2 if W=N;
A is $C_xH_{2x}$ wherein x is 2, 3, 4, or 5, or $CH_2CH(C_6H_5)$;
a is an integer from 2 to 350;
$R^{24}$ is H or an unbranched or branched $C_1$-$C_4$ alkyl group;
$R^{25}$ is H or an unbranched or branched $C_1$-$C_4$ alkyl group;

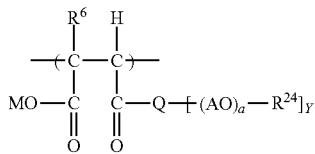
(IId)

in which
$R^6$ is H or an unbranched or branched $C_1$-$C_4$ alkyl group;
Q is $NR^{10}$, N, or O;
Y is 1 if Q=O or $NR^{10}$, and is 2 if Q=N;
$R^{10}$ is H or an unbranched or branched $C_1$-$C_4$ alkyl group;
A is $C_xH_{2x}$ wherein x is 2, 3, 4, or 5, or $CH_2C(C_6H_5)H$;
$R^{24}$ is H or an unbranched or branched $C_1$-$C_4$ alkyl group;
M is H or one cation equivalent; and
a is an integer from 2 to 350.

10. The additive as claimed in claim 8, wherein the polymer as anionic or anionogenic group has at least one structural unit of the formulae (Ia), (Ib), (Ic) and/or (Id):

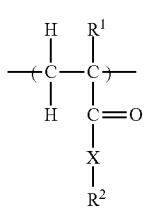
(Ia)

wherein
$R^1$ is H or an unbranched or branched $C_1$-$C_4$ alkyl group, $CH_2COOH$, or $CH_2CO$—X—$R^3$;
X is NH—$(C_nH_{2n})$ or O—$(C_nH_{2n})$, wherein n is 1, 2, 3, or 4, or is a chemical bond, the nitrogen atom or oxygen atom, respectively, being bonded to the CO group;
$R^2$ is OM, $PO_3M_2$, or O—$PO_3M_2$; with the proviso that X is a chemical bond if $R^2$ is OM;
$R^3$ is $PO_3M_2$, or O—$PO_3M_2$;

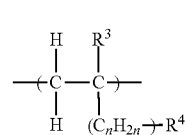
(Ib)

wherein
$R^3$ is H or an unbranched or branched $C_1$-$C_4$ alkyl group;
n is 0, 1, 2, 3, or 4;
$R^4$ is $PO_3M_2$, or O—$PO_3M_2$;

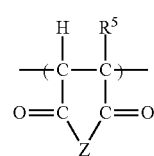
(Ic)

wherein
$R^5$ is H or an unbranched or branched $C_1$-$C_4$ alkyl group;
Z is O or $NR^7$; and
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;
n is 1, 2, 3, or 4;

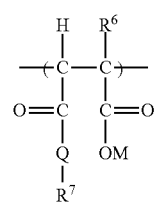
(Id)

wherein
$R^6$ is H or an unbranched or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$;
n is 1, 2, 3, or 4; and
each M independently of any other is H or one cation equivalent.

11. The additive as claimed in claim 10, wherein the dispersant comprises no units of the formula (IIc) when it comprises units of the formula (Ia) in which X is a chemical bond and $R^2$ is M.

12. The additive as claimed in claim 10, wherein the dispersant comprises at least one polymer which is a polycondensation product comprising structural units (III) and (IV):

(III)

wherein
T is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O, and S;
n is 1 or 2;
B is N, NH, or O, with the proviso that n is 2 if B is N and with the proviso that n is 1 if B is NH or O;
A is $C_xH_{2x}$ wherein x is 2, 3, 4, or 5, or $CH_2CH(C_6H_5)$;
a is an integer from 1 to 300;
$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O, and S;
the structural unit (IV) being selected from the structural units (IVa) and (IVb):

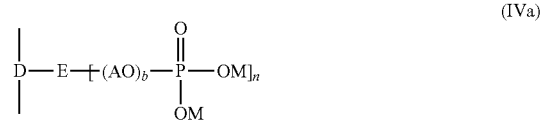
(IVa)

wherein
D is a substituted or unsubstituted phenyl radical, a substituted or unsubstituted naphthyl radical or a substituted or unsubstituted heteroaromatic radical having 5 to 10 ring atoms, of which 1 or 2 atoms are heteroatoms selected from N, O, and S;
E is N, NH, or O, with the proviso that m is 2 if E is N and with the proviso that m is 1 if E is NH or O;
A is $C_xH_{2x}$ wherein x is 2, 3, 4, or 5, or $CH_2CH(C_6H_5)$;
b is an integer from 1 to 300;
M independently at each occurrence is H or one cation equivalent;

(IVb)

in which
V is a substituted or unsubstituted phenyl radical or a substituted or unsubstituted naphthyl radical;
$R^7$ is COOM, $OCH_2COOM$, $SO_3M$, or $OPO_3M_2$;
M is H or one cation equivalent;
the phenyl, naphthyl or heteroaromatic radicals mentioned being optionally substituted by 1 or two radicals selected from $R^8$, OH, $OR^8$, $(CO)R^8$, COOM, $COOR^8$, $SO_3R^8$, and $NO_2$; and
and
$R^8$ is $C_1$-$C_4$ alkyl, phenyl, naphthyl, phenyl-$C_1$-$C_4$ alkyl, or $C_1$-$C_4$ alkylphenyl.

13. A process for preparing an additive as claimed in claim 1, comprising the steps of:
reacting at least one sulfonic acid compound of the formula (I) in which $K^{n+}$ is $Ca^{2+}$ with at least one water-soluble inorganic silicate compound in the presence of an aqueous solution of a dispersant.

14. The process as claimed in claim 13, comprising an additional process step of drying the hardening accelerator composition, the drying taking place preferably by spray drying or roll drying.

15. A building material mixture comprising a hydraulic binder and the additive as claimed in claim 1.

16. A building material mixture comprising a hydraulic binder and the additive as claimed in claim 2.

17. A building material mixture comprising the additive as claimed in claim 1 and at least one member selected from the group consisting of Portland cement, slag, flyash, lime and a pozzolan.

18. A method for preparing a building material mixture comprising mixing the additive as claimed in claim 1 with a hydraulic binder.

* * * * *